United States Patent
Ishibashi et al.

(10) Patent No.: US 7,266,073 B2
(45) Date of Patent: Sep. 4, 2007

(54) OPTICAL DISC APPARATUS, CAMERA APPARATUS, AND METHOD FOR CONTROLLING LIGHT EMISSION OPERATION

(75) Inventors: Kenzo Ishibashi, Moriguchi (JP); Akira Yoshikawa, Nara (JP); Makoto Ichinose, Sakai (JP); Katsumi Gotoh, Ashiya (JP); Takatoshi Yukimasa, Ibaraki (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 548 days.

(21) Appl. No.: 10/839,119

(22) Filed: May 5, 2004

(65) Prior Publication Data
US 2004/0233825 A1 Nov. 25, 2004

(30) Foreign Application Priority Data
May 8, 2003 (JP) .............................. 2003-130105

(51) Int. Cl.
*G11B 7/00* (2006.01)
(52) U.S. Cl. ...................................... 369/120; 369/116
(58) Field of Classification Search ................ 369/120, 369/121, 122, 116, 47.5, 47.51, 47.52, 47.53, 369/47.33
See application file for complete search history.

(56) References Cited
U.S. PATENT DOCUMENTS
7,082,094 B2 7/2006 Morishima et al.

FOREIGN PATENT DOCUMENTS

| | | |
|---|---|---|
| CN | 1300074 | 6/2001 |
| CN | 1416114 | 5/2003 |
| EP | 1 098 323 B1 | 11/2003 |
| JP | 1-245438 * | 9/1989 ............. 369/47.33 |
| JP | 5-205270 * | 8/1993 ............. 369/47.33 |
| JP | 7-161043 | 6/1995 |
| JP | 11-276917 | 9/1999 |
| JP | 2001-331960 | 11/2001 |
| JP | 2002-063726 | 2/2002 |
| JP | 2002-122706 | 4/2002 |

OTHER PUBLICATIONS

Chinese Office Action for corresponding Application No. 200410063125.5 dated Aug. 11, 2006.

* cited by examiner

*Primary Examiner*—Nabil Hindi
(74) *Attorney, Agent, or Firm*—Renner, Otto, Boisselle & Sklar, LLP

(57) ABSTRACT

An optical disc apparatus is provided, which comprising a laser light emitting portion for generating laser light for irradiating an optical disc, and a laser control portion for controlling a light emission operation of the laser light emitting portion. The laser control portion causes the laser light emitting portion to emit light with a first period during a first operation, and the laser control portion causes the laser light emitting portion to emit light with a second period during a second operation. The first period and the second period are different from each other.

26 Claims, 7 Drawing Sheets

US 7,266,073 B2

OPTICAL DISC APPARATUS, CAMERA APPARATUS, AND METHOD FOR CONTROLLING LIGHT EMISSION OPERATION

This non-provisional application claims priority under 35 U.S.C. §119(a) on Patent Application No. 2003-130105 filed in Japan on May 8, 2003, the entire contents of which are hereby incorporated by reference.

BACKGROUND OF THE INVENTION

1. Field of the Invention

The present invention relates to an optical disc apparatus, a camera apparatus, and a method for controlling a light emission operation. More particularly, the present invention relates to an optical disc apparatus, a camera apparatus, and a method for controlling a light emission operation, wherein power consumption and an increase in temperature due to a laser light emitting portion mounted on an optical head portion are suppressed.

2. Description of the Related Art

Recently, the development of a technique for writing data onto a phase change rewritable optical disc using a blue laser and an objective lens having as high a numerical aperture (NA) as 0.85, has proceeded closer toward an optical disc having a diameter of as small as about 5 to 8 cm, which can store as large as about 4 to 16 GB of data (the maximum volume is achieved by a double layer technique). Such an optical disc can store video and audio data with the same quantity and quality as those of typical cassette tapes, if an image compression technique, such as MPEG2 or the like, is used. Therefore, a full-fledged optical disc video camera would be realized. If a transfer rate is increased, such an optical disc can be used to store high-definition (HD) video images.

Optical discs have an advantage of random access, i.e., no rewinding, which may cause irritation of the user, is required. For example, by selecting thumbnail images, a desired scene can be quickly reproduced. Thus, optical discs lead to the realization of a video camera convenient and comfortable to the user. In addition, still pictures compressed by JPEG or the like can be stored on the same optical disc. Such a video camera is highly expected as the next generation of video camera to provide a new concept to the user.

Generally, a laser light emitting portion incorporated in an optical disc apparatus has a greater quantity of heat generated per volume than other ICs or electronic components. The operation of such a laser light emitting portion is guaranteed below as low as about 60° C. to 70° C. (maximum temperature), and the life span is shortened as the operating temperature is increased even if it is below the maximum temperature. Therefore, there is a demand for an optical disc apparatus, in which the power consumption of the whole apparatus is reduced or the heat dissipation structure is improved to suppress an increase in temperature inside the apparatus, thereby reducing the operating temperature of a laser light emitting portion mounted on an optical head. The present invention is directed to the reduction of power consumption, particularly the reduction of the power consumption of the laser light emitting portion itself. By suppressing the power consumption of the laser light emitting portion, it is possible to suppress an increase in temperature of the laser light emitting portion under the same ambient temperature (temperature inside the apparatus).

A conventional technique for reducing the power consumption of a laser light emitting portion, is intermittent reproduction for music MD (e.g., Japanese Laid-Open Publication No. 7-161043). This is a method for starting or stopping an optical disc apparatus at intervals during a reproduction operation. According to this technique, substantially no power is consumed by the laser light emitting portion and the like during the stop period, thereby making it possible to reduce the average power for an optical disc driving portion including the laser light emitting portion. Therefore, the life span of the battery can be extended.

Hereinafter, the above-described intermittent reproduction operation will be described. It is assumed that the reading rate of music data from an optical disc is much higher than the input rate of music data into a decoder. To reproduce music, an optical disc driving portion is actuated. Music data is rapidly reproduced and is transferred and temporarily stored in a buffer memory (reading state). If the buffer memory is full, the optical disc driving portion is temporarily stopped so that substantially no power is consumed by the optical disc driving portion, the laser light emitting portion, and the like (stop state). Meanwhile, the music data is transferred from the buffer memory to a decoder at a constant rate to continuously reproduce music. Subsequently, if the remaining quantity of the music data goes below a prescribed level of the buffer memory, the optical disc driving portion is operated again and the continued music data is rapidly read out and stored into the buffer memory. The above-described operations are repeatedly performed during the reproduction of music. The music data is transferred to the decoder at a constant rate during the reproduction of music.

During the reading state the optical disc driving portion consumes power for actuating and reading operations, while during the stop state substantially no power is consumed. Therefore, the average power consumption can be reduced, depending on the ratio of the duration of the reading state (read time) to the duration of the stop state (stop time). Although the laser light emitting portion is continuously on during the read time, it goes to the stop state before a significant increase in the temperature of the laser light emitting portion. Therefore, the laser light emitting portion is cooled during the stop state, thereby making it possible to reduce the average temperature of the laser light emitting portion.

Note that the actuation from the stop state to the reading state requires initiating the rotation of a motor, switching a laser ON, focusing control, tracking control, and the like. This can take several seconds. These operations also require power slightly greater than that required during the reading state. However, when music data is reproduced from MD or the like, the stop time is much longer than the read time. Therefore, power consumption can be reduced and an increase in temperature of the laser light emitting portion can be suppressed. Note that the intermittent reproduction technique is also applicable when data is recorded or written onto an optical disc.

On the other hand, a technique has been devised for reducing the power consumption of a laser light emitting portion during reproduction where an optical disc is driven. For example, a technique for pulse-driving a laser light emitting portion in synchronization with the periods of reproduced data signal (Japanese Laid-Open Publication No. 2002-63726), or a technique for pulse-driving a laser light emitting portion with a frequency much higher than the frequency of data signal (Japanese Laid-Open Publication No. 2001-331960), have been disclosed. In the former, laser light is intermittently emitted, matching the channel bit periods of data. Data edge is detected when light is emitted, while an edge is not detected when light is not emitted. Therefore, the power consumption of the laser light emitting portion can be reduced with substantially no influence on information reproduction. In the latter, the laser is alternately switched on and off at a rate much higher than the frequency of data, and data is reproduced by detecting a data envelope. In this case, an influence of the flickering of the laser can be removed and the average current of the laser light emitting portion can be reduced, thereby reducing power consumption.

However, when an optical disc apparatus is used for a system requiring a high speed data processing rate (e.g., a video image system), the effect of the above-described intermittent reproduction technique (hereinafter referred to as a stop-type intermittent operation) is small. This is because the ratio of the image data processing rate to the image data recording/reproduction rate to an optical disc cannot be greatly increased as compared to the ratio of the audio data transfer rate to the image data transfer rate. As a result, a longer time has to be assigned to reading data from an optical disc during a prescribed period, while a shorter time is assigned to the stop period. Therefore, the effects of the stop-type intermittent operation, such as a reduction in power consumption and the suppression of an increase in temperature, are reduced.

When the data processing rate is increased closer to the data recording/reproduction rate, it is difficult to perform a stop operation itself, because of the time from the stop to the restart. That is, it is difficult to perform stop-type intermittent operations.

A specific example will be described below. It is assumed that a small-diameter optical disc has a limitation on the number of revolutions, so that the maximum transfer rate is limited to, for example, 20 Mbps. To realize an audio and video-mixed stream having image quality comparable to that of DV tape using MPEG2, the data stream needs to be transferred at a rate of 9 Mbps. If the stream is transferred at such a rate, intermittent operations can be performed. However, the read time includes the actuation time of a few seconds. Therefore, it is possible to realize intermittent operations having a period of several tens of seconds. However, it is difficult to increase the stop time by a factor of ½ or more. Taking into account a spare time for retrying for actuation or the like, the stop time needs to be further shortened. Therefore, in this application, a satisfactory intermittent effect cannot be expected. If the stream is transferred at a so-called variable bit rate so as to improve image quality, the transfer rate of the stream may be, for example, 15 Mbps at maximum despite the average 9 Mbps. It is possible that the 15 Mbps transfer is continued for several tens of seconds. Taking into account the above-described spare time, it is difficult to perform a stop-type intermittent operation. Thus, in applications, such as a video camera and the like, there is a demand for novel measures for low power consumption (and prevention of an increase in temperature).

In this regard, the above-described techniques of Japanese Laid-Open Publication No. 2002-63726 and Japanese Laid-Open Publication No. 2001-331960 are effective for achievement of low power consumption. The flickering duty of a laser light emitting portion during reproduction needs to be about 50% and therefore, power consumption is expected to be reduced to such a level. However, as described in Japanese Laid-Open Publication No. 2002-63726, the technique of flickering at a data channel frequency is not considered to be practical, because when a blue laser is used to reproduce hyper-density data, more information is loot when the laser is switched off, so that the quality of reproduced signals is not practical. For example, if jitter is large, data loss is expected to occur.

Japanese Laid-Open Publication No. 2001-331960 discloses a technique for using a clock signal having a frequency sufficiently higher than a data frequency to drive a laser light emitting portion, thereby reducing the power consumption of the laser light emitting portion by half. In a light emission system which is operated at a frequency higher than a data frequency, a high frequency module (HFM) for reducing noise caused by returning light of the laser light emitting portion using current convolution may be used. However, when a laser light emitting portion is operated at a high speed comparable to the operation of HFM and a current amplitude higher than that of HFM, there is a fear that a means for driving the laser light emitting portion generates heat. Since the laser light emitting portion is driven at a high frequency, it is necessary to place the driving means close to the laser light emitting portion in order to avoid the undesired radiation problem. In this case, the heat generated by the driving means leads to an increase in temperature of the laser light emitting portion. Thus, it may be difficult to obtain an effect of suppressing the temperature increase.

SUMMARY OF THE INVENTION

According to an aspect of the present invention, an optical disc apparatus is provided, which comprises: a laser light emitting portion for generating laser light for irradiating an optical disc; and a laser control portion for controlling a light emission operation of the laser light emitting portion. The laser control portion causes the laser light emitting portion to emit light with a first period during a first operation, and the laser control portion causes the laser light emitting portion to emit light with a second period during a second operation. The first period and the second period are different from each other.

In one embodiment of the present invention, in at least one of the first period and the second period, a length of an interval during which the laser light emitting portion emits light is different from a length of an interval during which the laser light emitting portion does not emit light.

In one embodiment of the present invention, the length of the interval during which the laser light emitting portion emits light is shorter than the length of the interval during which the laser light emitting portion does not emit light.

In one embodiment of the present invention, the first operation is a reading preparation operation for performing preparation for reading information from the optical disc. The second operation is a reading operation for reading the information from the optical disc.

In one embodiment of the present invention, the first operation is a first reading preparation operation for performing preparation for reading information from the optical disc. The second operation is a second reading preparation operation for performing preparation for reading the information from the optical disc.

In one embodiment of the present invention, the first operation is a first recording preparation operation for performing preparation for recording information onto the optical disc. The second operation is a second recording preparation operation for performing preparation for recording the information onto the optical disc.

In one embodiment of the present invention, the first operation is an operation for performing a focusing control and a tracking control when neither a reading preparation operation for performing preparation for reading information from the optical disc nor a reading operation for reading the information from the optical disc is performed. The second operation is an operation for performing a focusing control and a tracking control when at least one of the reading preparation operation and the reading operation is performed.

In one embodiment of the present invention, values of the first period and the second period are each equal to or less than a value capable of maintaining a focusing control and a tracking control.

In one embodiment of the present invention, the first period and the second period are each in the range of 250 μs to 500 μs.

In one embodiment of the present invention, the laser control portion applies substantially no drive current to the laser light emitting portion during an interval of each of the first period and the second period, wherein during the interval the laser light emitting portion does not emit light.

In one embodiment of the present invention, the laser control portion applies a drive current to the laser light emitting portion during an interval of each of the first period and the second period, wherein the drive current is incapable of causing the laser light emitting portion to emit light, and during the interval the laser light emitting portion does not emit light.

In one embodiment of the present invention, the optical disc apparatus further comprises a high frequency module for reducing noise generated by light reflected from the optical disc. An operation of the high frequency module is stopped during an interval in which the laser light emitting portion does not emit light.

In one embodiment of the present invention, the optical disc apparatus further comprises a high frequency module for reducing noise generated by light reflected from the optical disc. An operation of the high frequency module is stopped during at least one of a reading preparation operation for performing preparation for reading information from the optical disc and a recording preparation operation for performing preparation for recording information onto the optical disc.

In one embodiment of the present invention, the optical disc apparatus further comprises: an address reproducing portion for reading address information from a reproduced signal; a reproduced signal processing portion for demodulating a reproduced signal; and a recording control portion for controlling recording of information onto the optical disc. Operations of the address reproducing portion, the reproduced signal processing portion, and the recording control portion are each stopped during idling.

In one embodiment of the present invention, the optical disc apparatus further comprises: a light detecting portion for generating a reproduced signal based on light reflected from the optical disc; and a signal generating portion for generating a focusing error signal and a tracking error signal by sampling/holing the reproduced signal.

In one embodiment of the present invention, the laser control portion and the signal generating portion are integrated into a single semiconductor chip.

In one embodiment of the present invention, the optical disc apparatus further comprises: an optical head portion comprising the laser light emitting portion; and a tracking control portion for performing a tracking control. During idling the tracking control portion controls the optical head portion so that a focus of the laser light follows the same track.

In one embodiment of the present invention, the optical disc apparatus further comprises: an optical head portion comprising the laser light emitting portion; and a tracking control portion for performing a tracking control. During idling an operation of the tracking control portion is stopped.

In one embodiment of the present invention, the first operation is a reading preparation operation for performing preparation for reading address information from the optical disc. The second operation is a reading operation for reading the address information from the optical disc.

In one embodiment of the present invention, the address information is previously recorded onto the optical disc by wobbling a guide groove contained in the optical disc. The second period is shorter than a wobbling period of the guide groove.

In one embodiment of the present invention, the laser control portion causes the laser light emitting portion to perform continuous light emission during a seeking operation.

In one embodiment of the present invention, the laser control portion causes a light emission period of the laser light emitting portion when a focusing control is performed to be shorter than a light emission period of the laser light emitting portion when the focusing control is not performed.

In one embodiment of the present invention, the optical disc apparatus further comprises a vibration detecting portion for performing at least one of detection and prediction of a vibration level of the optical disc apparatus. The laser control portion causes a light emission period of the laser light emitting portion when the vibration level is a prescribed level or more to be shorter than a light emission period of the laser light emitting portion when the vibration level is less than the prescribed level.

In one embodiment of the present invention, the optical disc apparatus further comprises a vibration detecting portion for performing at least one of detection and prediction of a vibration level of the optical disc apparatus. The laser control portion causes the laser light emitting portion to perform continuous light emission when the vibration level is a prescribed level or more.

In one embodiment of the present invention, the is optical disc apparatus further comprises a temperature detecting portion for detecting a temperature of the laser light emitting portion. The laser control portion causes a light emission period of the laser light emitting portion when the temperature of the laser light emitting portion is lower than an operation guaranteeing temperature of the laser light emitting portion by a prescribed value or more, to be shorter than a light emission period of the laser light emitting portion when the temperature of the laser light emitting portion is not lower than the operation guaranteeing temperature by the prescribed value or more.

In one embodiment of the present invention, the laser control portion causes a light emission period of the laser light emitting portion when waiting for execution of reading information from the optical disc, to be longer than a light emission period of the laser light emitting portion when the reading is performed.

In one embodiment of the present invention, the laser control portion causes a light emission period of the laser light emitting portion when waiting for execution of recording information onto the optical disc, to be longer than a light emission period of the laser light emitting portion when the recording is performed.

According to another aspect of the present invention, a camera apparatus is provided, which comprises: a camera portion for generating video information indicating video from incident light; a displaying portion for displaying the video indicated by the video information; and an optical disc driving portion for recording the video information onto an optical disc and reproducing video information recorded in the optical disc. The optical disc driving portion comprises a laser light emitting portion for generating laser light for irradiating the optical disc; and a laser control portion for controlling a light emission operation of the laser light emitting portion. The laser control portion causes the laser light emitting portion to emit light with a first period during a first operation, and the laser control portion causes the laser light emitting portion to emit light with a second period during a second operation. The first period and the second period are different from each other.

According to another aspect of the present invention, a method is provided for controlling a light emission operation of a laser light emitting portion for generating a laser light for irradiating an optical disc, comprising the steps of: causing the laser light emitting portion to emit light with a first period during a first operation; and causing the laser light emitting portion to emit light with a second period during a second operation. The first period and the second period are different from each other.

According to the present invention, a laser light emitting portion is caused to emit light with a first period during a first operation, and light with a second period during a second operation. The first period and the second period are different from each other. By adjusting a light emission period of the laser light emitting portion depending on each operation, it is possible to perform each operation reliably and suppress the temperature increase and power consumption of the laser light emitting portion. In addition, the temperature increase of the laser light emitting portion can be suppressed and the driving time of the laser light emitting portion can be shortened, thereby making it possible to extend the life span of the laser light emitting portion.

According to the present invention, by intermittently pulse-driving the laser light emitting portion during a preparation operation for recording or reproduction of the optical disc apparatus, it is possible to dramatically reducing the power consumption of the laser light emitting portion to substantially zero (1% or less of the power consumption during continuous light emission). Therefore, particularly in an optical disc apparatus in which information is intermittently recorded or reproduced, the laser light emitting portion is used substantially only when recording or reproduction is performed. Thereby, it is possible to minimize the temperature increase of the laser light emitting portion. As a result, the optical disc apparatus of the present invention or an apparatus incorporating the same can be used under high temperature atmosphere in which apparatuses, to which the present invention is not applied, cannot be used. In another aspect of this feature, when used in the same ambient temperature, the life span of the laser light emitting portion can be extended, because the optical disc apparatus of the present invention can suppress the temperature increase of the laser light emitting portion.

Further, according to the present invention, the life span of the laser light emitting portion can be extended in terms of the working time of the laser light emitting. Generally, optical disc apparatuses require a period of time for a preparation operation for recording or reproduction before and after recording or reproduction. By performing intermittent idling during the preparation operation, it is possible to stop the driving of the laser light emitting portion during an OFF interval so that the laser light emitting portion is in the non-operating state. Thereby, it is possible to reduce a cumulated operating time of the laser light emitting portion during the preparation operation to substantially a negligible level. The user recognizes that the life span of the laser light emitting portion is significantly extended. In other words, the life span of the optical disc apparatus is substantially determined based on the cumulated time of recording and reproduction operations. The preparation operation time for recording and reproduction has substantially no influence on the life span of an optical disc apparatus. Moreover, according to the present invention, an optical disc apparatus can be maintained in a preparation state for recording or reproduction with low power consumption, and the optical disc apparatus can be quickly transitioned into the recording or reproduction state. Therefore, it is possible to quickly respond to the user's request, such as reproduction of video information from an optical disc, or the like.

Further, according to the present invention, it is possible suppress the power consumption of the laser light emitting portion and other circuits, thereby providing an optical disc apparatus having low power consumption. Particularly, in a battery-driven portable apparatus, the life of the battery can be extended or a smaller battery can be driven for the same duration. Also, it is possible to suppress the temperature increase due to low power consumption, thereby providing a smaller optical disc apparatus.

The present invention reduces the power consumption of an optical disc apparatus and a device carrying the same and secure the operation at higher temperature, while securing the operating reliability and the long life span of a laser light emitting portion.

Thus, the practical affect of the present invention is significant.

Thus, the invention described herein makes possible the advantages of providing an optical disc apparatus capable of suppressing an increase in temperature and power consumption of a laser light emitting portion, a camera apparatus incorporating the same, and a method for controlling a light emission operation.

These and other advantages of the present invention will become apparent to those ski led in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Embodiment 1

Figure 1:
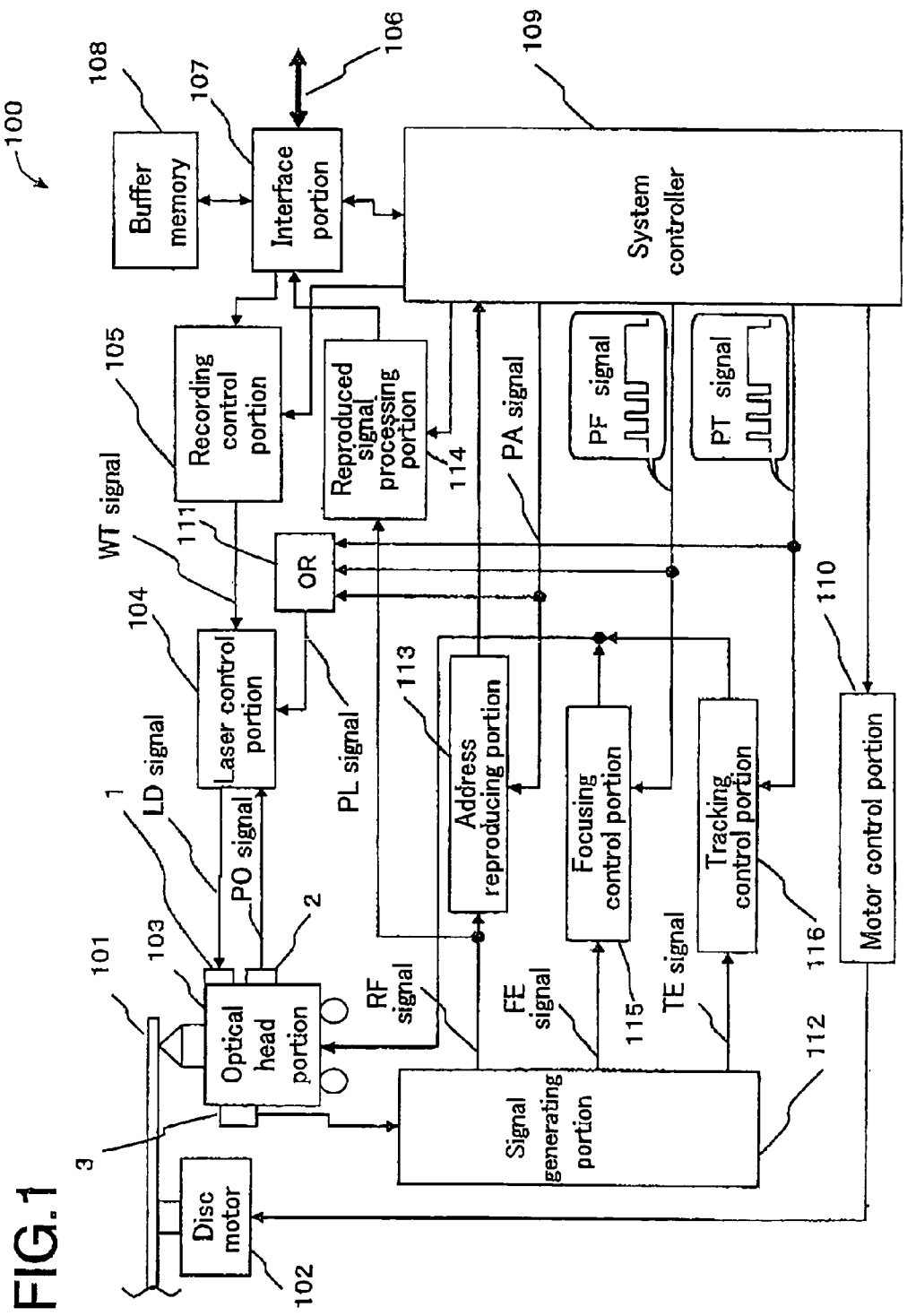
FIG. 1 is a block diagram showing an optical disc apparatus according to Embodiment 1 of the present invention.
Figure 2:
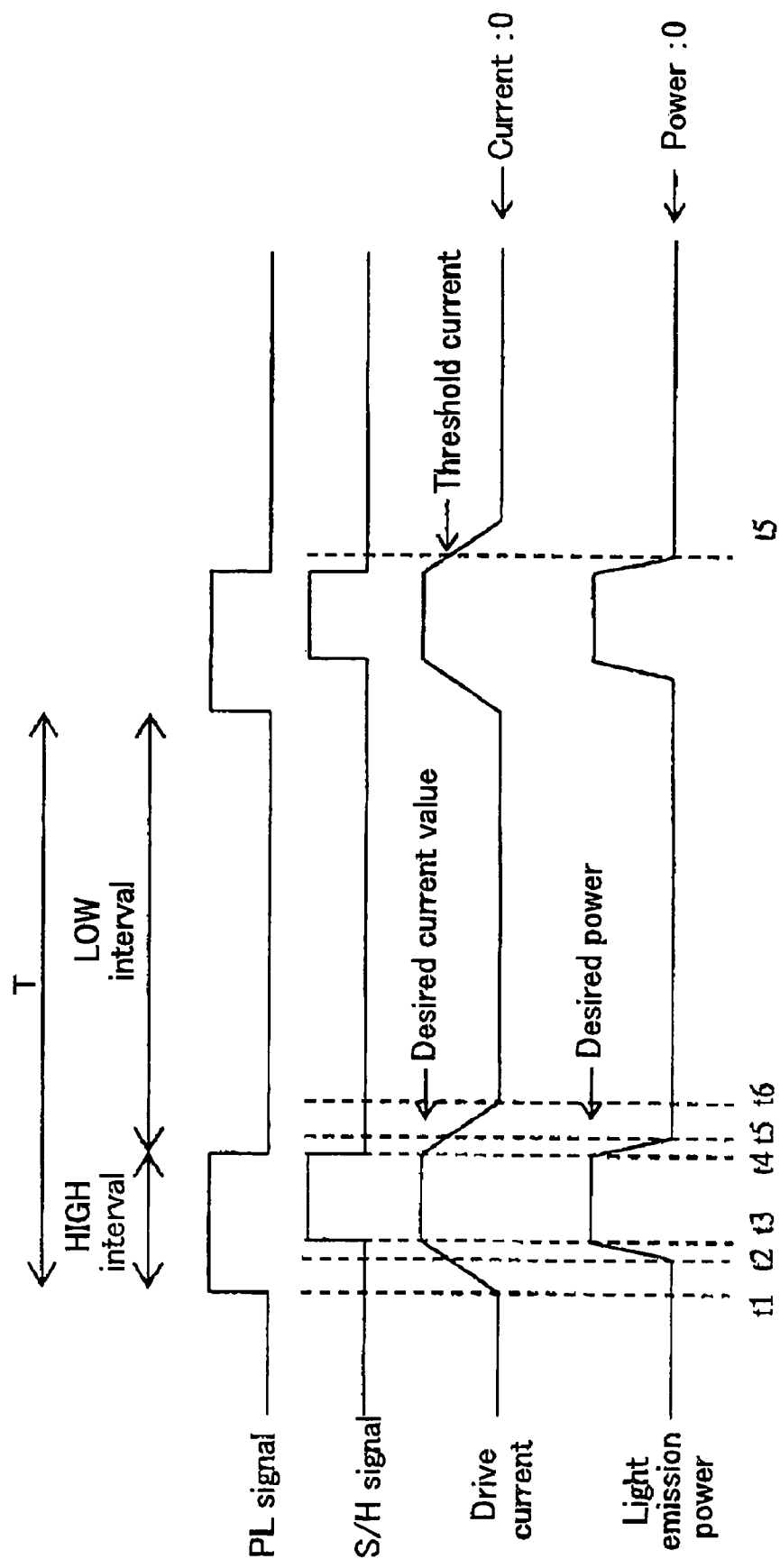
FIG. 2 is a basic timing diagram for explaining a semiconductor laser control according to Embodiment 1 of the present invention.
Figure 3:
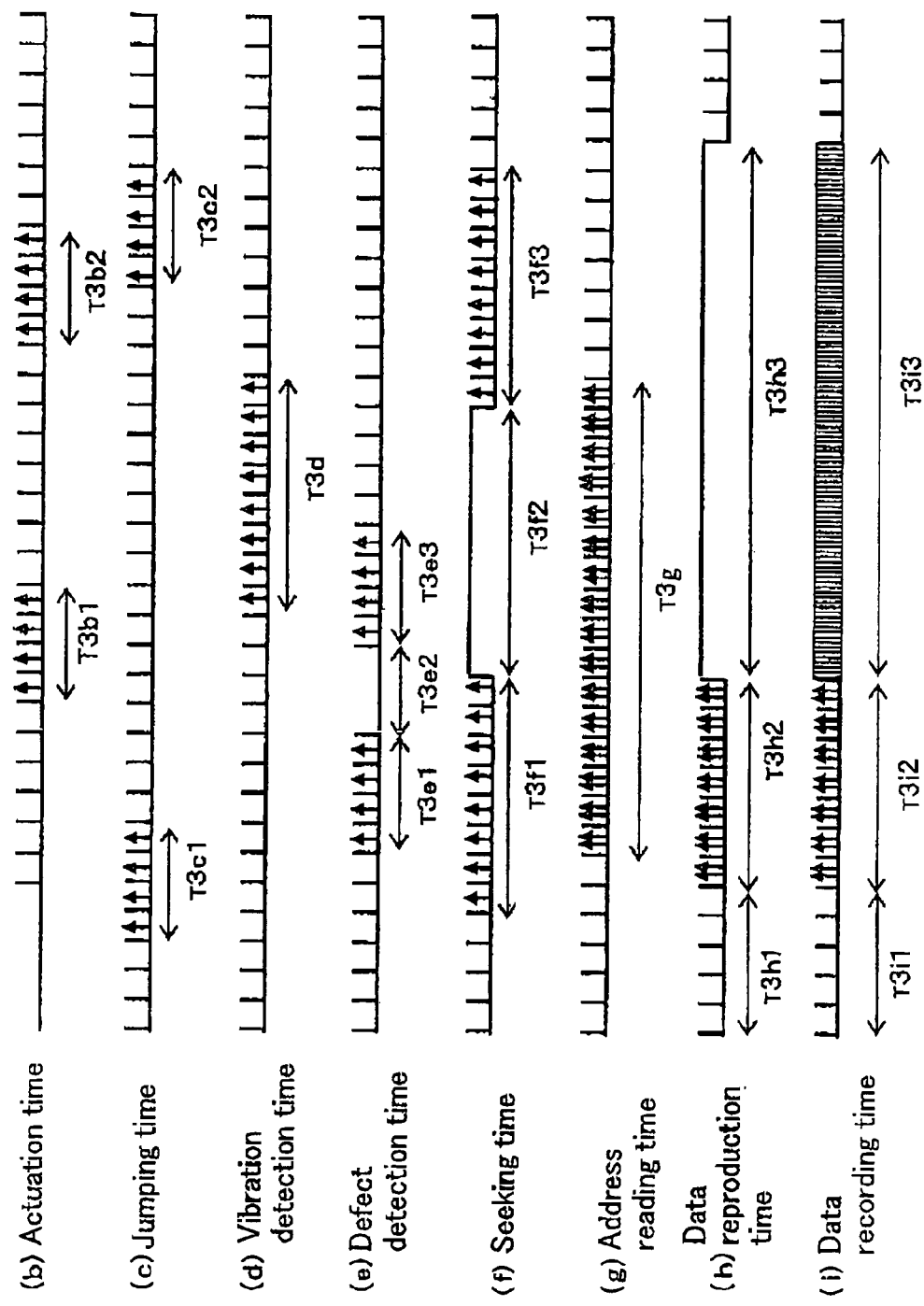
FIG. 3 is a diagram showing timings of light emission by the laser light emitting portion of Embodiment 1 for each control operation.
Figure 4:
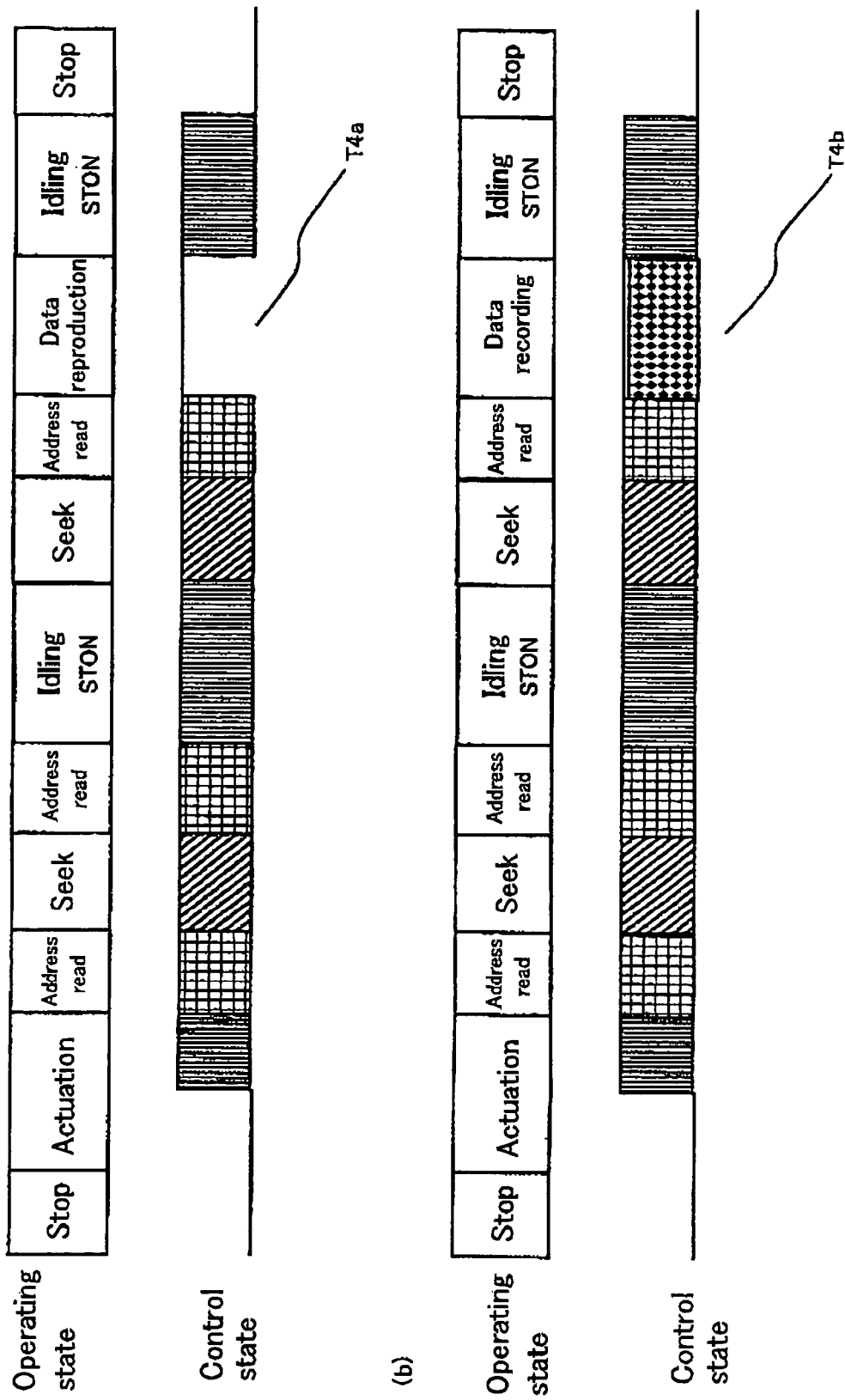
FIG. 4 is a timing diagram for information recording/reproduction in Embodiment 1.

FIG. 1 shows an optical disc apparatus 100 according to Embodiment 1 of the present invention. FIGS. 2, 3 and 4 are timing diagrams for explaining an operation of the optical disc apparatus 100.

For the sake of simplicity, FIG. 1 shows only major components constituting the present invention. The other components of the optical disc apparatus are omitted and a description thereof is also omitted.

An optical disc 101 is carried on the optical disc apparatus 100. The optical disc apparatus 100 performs at least one of data recording and reproducing operations with respect to the optical disc 101, i.e., the optical disc apparatus 100 may be a recording apparatus, a reproduction apparatus or a recording/reproduction apparatus. Information, such as user data or the like, is recorded in a guide groove possessed by the optical disc 101. Address information is previously recorded onto the optical disc 101 by wobbling the guide groove possessed by the optical disc 101.

The optical disc apparatus 100 comprises a disc motor 102, an optical head portion 103, a laser control portion 104, a recording control portion 105, an ATAPI interface 106, an interface portion 107, a buffer memory 108, a system controller 109, a motor control portion 110, an OR circuit portion 111, a signal generating portion 112, an address reproducing portion 113, a reproduced signal processing portion 114, a focusing control portion 115, and a tracking control portion 116.

The optical head portion 103 comprises a laser light emitting portion 1, a power detecting portion 2, a light detecting portion 3, optical parts (not shown), an actuator (not shown), and the like. The laser light emitting portion 1, which generates laser light with which the optical disc 101 is irradiated, may be composed of, for example, a semiconductor laser device. The optical head portion 103 emits laser light onto the optical disc 101 to read and write information.

The optical disc 101 is rotated by the disc motor 102. The optical head portion 103 is used to perform information recording/reproduction with respect to the optical disc 101. The power detecting portion 2 measures the power of the laser light emitting portion 1. The light detecting portion 3 generates a reproducing signal for detecting a radio frequency signal (RF signal), a focus error signal (FE signal) and a tracking error signal (TE signal), based on light reflected from the optical disc 101. The actuator performs focusing control and tracking control so as to form a light spot onto a guide groove of the optical disc 101.

The laser control portion 104 controls the light emission operation of the laser light emitting portion 1. The power of the laser light emitting portion 1 is controlled by the laser control portion 104. More specifically, the laser control portion 104 receives a PO signal from the power detecting portion 2, and determines the power of the laser light emitting portion 1 by a feedback control using an LD signal. Except for the time of recording operation (e.g., reproduction mode), the laser control portion 104 is operated as follows: if a PL signal is at a high level (hereinafter referred to as HIGH), the laser light emitting portion 1 is switched ON; and if the PL signal is at a low level (hereinafter referred to as LOW), the laser light emitting portion 1 is switched OFF. The power value is controlled to be an intended level by feeding back the value of the PO signal when the PL signal is HIGH. In the recording mode, the laser light emitting portion 1 outputs multi-pulses having multiple recording power levels (so-called writing strategy) represented by WT signals output from the recording control portion 105. As a result, the optical disc 101 is irradiated with laser light having an optimum power pattern.

During information recording, recording information is transferred via the ATAPI interface 106 from an external PC or application (not shown) to the interface portion 107. The recording information is temporarily stored in the buffer memory 108. Thereafter, an error correction code is added to the recording information or the recording information is modulated. The recording information is processed by the recording control portion 105 into a prescribed format data. Thereafter, the recording information is recorded onto the optical disc 101. These operations are controlled by the system controller 109 which governs the operation control of the whole optical disc apparatus 100. The system controller 109 comprises a microcomputer, a hardware device, and the like.

To perform information recording, the laser control portion 104 controls preparation operations for recording. Specifically, the motor control portion 110 rotates the disc motor 102 at a prescribed number of revolutions. The motor control portion 110 also controls the power of the laser light emitting portion 1 to be a reproduction level. In this case, the reproduction power is intermittently switched ON and OFF, depending on the PL signal output from the OR circuit portion 111. As a result, preparation operations for recording or reproduction (focusing control, tracking control, address information reading control, seeking control, idling control, etc.) can be performed while switching ON the laser light emitting portion 1 as less frequently as possible. This is a feature of the present invention. Thereby, it is possible to suppress the power consumption and the temperature increase of the laser light emitting portion 1, and a cumulated ON time, and improve the reliability and the life span of the apparatus. As used herein, the term "intermittent idling" refers to performing preparation operations for recording/reproduction while pulse-driving the laser light emitting portion 1. The OFF interval of the light emission period is much longer than the ON interval. Therefore, it is possible to reduce the power consumption, temperature increase, and cumulated ON time of the semiconductor laser. The light emission period varies depending on the operation mode of the optical disc apparatus 100. Preferably, the value of the light emission period is equal to or less than the value which can maintain the focusing control and the tracking control.

The signal generating portion 112 receives a reproduced signal output from the light detecting portion 3 and samples and holds it to generate an RF signal, an FE signal and a TE signal. The RF signal is input to the address reproducing portion 113 and the reproduced signal processing portion 114. The FE signal and the TE signal are input to the focusing control portion 115 and the tracking control portion 116, respectively, which play a role in servo control. The system controller 109 transfers pulse signals (a PA signal, a PF signal, and a PT signal) for switching ON the laser light emitting portion 1 to the OR circuit portion 111, depending on the operation state during reproduction. Simultaneously, the PA signal, the PF signal, and the PT signal are transferred to the address reproducing portion 113, the focusing control portion 115, and the tracking control portion 116, respectively. The address reproducing portion 113, the focusing control portion 115, and the tracking control portion 116 perform address reproduction, focusing control, and tracking control, respectively, when the pulse signal is HIGH.

The details of the pulse timing of the above-described three pulse signals will be described below. Briefly, the PL signal is controlled to be HIGH during information reproduction. While addresses are reproduced by the address reproducing portion 113 from the continuous RF signal, the continuous RF signal is input to the reproduced signal processing portion 114. The reproduced signal processing portion 114 subjects the RF signal to demodulation and error correction corresponding to the data format to restore and read the reproduced information. The reproduced information read is temporarily stored in the buffer memory 108, and thereafter, is transferred from the interface portion 107 via the ATAPI interface 106 in response to a request of an external PC or application.

In Embodiment 1, a typical example of intermittent idling for pulse-driving the laser light emitting portion 1 is an idling operation called STON. In the idling operation called STON, while the rotation of the optical disc 101 is maintained, the focusing control and the tracking control of the optical head portion 103 are performed by the focusing control portion 115 and the tracking control portion 116 so that the focus of laser light follows the same track. In the waveforms of the PF signal and the PT signal (FIG. 1), the first three pulses represent the STON state, while the subsequent HIGH interval represents an information reproduction interval. When the next track from which data is to be reproduced is previously known, it is possible to quickly transition into a recording or reproducing operation without a seek operation if the optical disc apparatus 100 is set to be in the STON state.

Note that each block (the laser control portion 104, is the signal generating portion 112, etc.) shown in FIG. 1 may be preferably divided into appropriate blocks, which are integrated into a plurality of semiconductor chips (e.g., LSI), or all blocks are integrated into a single semiconductor chip (e.g., LSI), thereby making it possible to obtain a small-sized optical disc apparatus 100.

FIG. 2 shows basic timings of the laser light emitting portion control during typical intermittent idling. From the top to the bottom, a PL signal, an S/H (sample/hold) signal, a drive current of the laser light emitting portion 1, and a light emission power of the laser light emitting portion 1 are successively shown. During idling, the PL signal is a pulse signal having a period T (a basic period of intermittent idling), and the HIGH interval ranges from time t1 to time t4. The laser control portion 104 receives the PL signal and outputs a drive current to the laser light emitting portion 1 at a prescribed through rate, and maintains the value of the drive current at a desired constant value from time t3 to t4. From time t4 at which the PL signal becomes LOW, the value is decreased at a prescribed through rate. The value is zero at time t6. The laser light emitting portion 1 emits laser light from time t2 to t5, during which the drive current exceeds a threshold current. From time t3 to t4, the laser light emitting portion 1 outputs laser light having a desired constant power. The S/H signal is a signal for specifying a time during which the laser light emitting portion 1 emits light at a desired constant power, and is used within the laser control portion 104 to control power. The HIGH S/H signal corresponds to a sampling interval, while the LOW S/H signal corresponds to a holding interval.

During idling, the reproduced signal is sampled during each light emission interval, so that the FE signal and the TE signal are generated. In this case, during idling, the frequency of the PL signal is a sampling frequency which can maintain the focusing control and the tracking control. To maintain only the focusing control and the tracking control, a servo band (the frequency band of a servo operation) can be set to be lower (e.g., about 1 kHz to 2 kHz) than a servo band during recording/reproduction. If the FE signal and the TE signal are sampled when the PL signal is HIGH, the sampling frequency is at least two times (2 kHz to 4 KHz) higher than that of the servo band. In this case, the light emission period is 250 μL to 500 μs. The FE signal and the TE signal are also obtained by sampling/holding operations based on the S/H signal.

The HIGH interval of the PL signal is shortened so that the light emission interval (time t3 to t4) of the laser light emitting portion 1 is equal to or less than 1 μs. In such a short duration, the FE signal or the TE signal, or a power detecting signal generated by the power detecting portion 2 can be adequately sampled. It is considered that the light emission interval can be reduced by improving the structure of the laser control portion 104 and the operating speed of an amplifier in the signal generating portion 112. If the through rate of a drive current is increased, the HIGH interval of PL can be substantially equal to the light emission interval of the laser light emitting portion 1.

During intermittent idling, the optical disc apparatus 300 is controlled according to the above-described basic timings indicated by the PL signal. A signal relating to control is sampled and obtained when the laser light emitting portion 1 emits light at a desired power. Therefore, such a sampling operation can be called a type of sample servo operation. However, a great difference from typical sample servo operations is that the laser light emitting portion 1 is controlled to emit light only when a control signal is required, but the laser light emitting portion 1 is controlled not to continuously emit light.

Therefore, the laser light emitting portion 1 consumes only power corresponding to the duty ratio of the PL signal, as compared with the continuous light emission. The temperature increase due to power consumption is also proportional to the duty ratio. In the above-described example, one period of the PL signal is equal to or more than 100 μs, and the light emission interval is 1 μs. Therefore, the average temperature increase can be rendered about 1% or less as compared to when continuous light emission is performed. In addition, the duration in which the laser light emitting portion 1 is driven can be rendered substantially 1% or less as compared to when continuous light emission is performed. Thereby, the life span of a device determined by the cumulated current-carrying time can be significantly extended. In addition, the operating temperature of the laser light emitting portion 1 can be reduced as compared with when the continuous light emission is performed. The reduction of temperature contributes the extension of the life span of a device. In another sense, the laser light emitting portion 1 can be used under high temperature conditions while keeping the laser light emitting portion 1 below the critical temperature. The intermittent idling provides the above-described effects. In addition, transition into recording/reproduction operations can be achieved in the same time interval as when continuous light emission is performed, without requiring a time to transition to recording/reproduction, unlike the above-described stop-type intermittent operation.

Note that the sampling frequency needs to be set to be high, depending on the required servo band. Not more than several tens of kilo hertz is sufficient for maintaining idling.

The above-described effect of the present invention is sufficiently obtained. In addition, by shortening the light emission interval, it is possible to suppress an increase in power consumption and temperature to about 1% or less as in the above-described case. For example when the light emission interval is as short as 0.1 μs, the duty ratio can be as small as 1% even if the sampling frequency is as high as 100 kHz.

However, during recording and reproducing operations, the same level of drive current as that of typical techniques is preferably applied to the semiconductor laser. When reproduction or recording is continuously performed for several tens of minutes, the temperature increase may not be sufficiently suppressed even if the intermittent idling is employed. However, when the information writing or reading rate with respect to an optical disc is higher than the information processing rate, the writing or reading operation can be performed while stopping it for several seconds to several tens of seconds. In this case, the intermittent idling can exhibit a sufficient effect of suppressing the temperature increase.

In addition, when the function of the laser light emitting portion 1 is not secured at an extremely low temperature, the laser light emitting portion 1 may be heated by applying a drive current to such an extent that the laser light emitting portion 1 does not emit light, i.e., the laser control portion 104 does not set the drive current to zero during an OFF interval during intermittent idling. Alternatively, continuous light emission may be performed until the temperature of the laser light emitting portion 1 is increased to a prescribed value. When the laser light emitting portion 1 is increased to an appropriate prescribed temperature, the laser control portion 104 does not substantially apply a drive current to the laser light emitting portion 1 during an interval in which the laser light emitting portion 1 does not emit light. Therefore, it is possible to suppress the power consumption and unwanted temperature increase of the laser light emitting portion 1 while keeping the appropriate temperature of the laser light emitting portion 1.

FIG. 3 is a diagram showing timings of light emission by the laser light emitting portion 1 for each control operation. Except for the time of information recording, the timing of light emission corresponds to the waveform of the PL signal. (a) of FIG. 3 shows basic timings during the simplest idling as described above. Vertical solid lines each indicate one pulse, though the timings are schematically shown. The relationship between the number of actual pulses and operations does not have a one-to-one correspondence.

FIG. 3, during control operations except for information reproduction and information recording, required switching ON intervals are added to the basic timings. During idling, since only a focusing control and a tracking control are performed, the PF signal and the PT signal have the same waveform as that of idling. Note that during idling, in order to reduce the power consumption of the whole optical disc apparatus 100, the recording control portion 105, the address reproducing portion 113, the reproduced signal processing portion 114, and the like, which are blocks which are not required for focusing control and tracking control, are rendered into a sleep state to halt the operation, by stopping voltage supply, clock, or the like.

Thus, currents consumed by blocks other than the blocks for maintaining focusing control and tracking control are reduced. In addition, in any state, not limited to idling, the relevant blocks are operated only when required, or are otherwise rendered into a sleep state. Thus, power consumption is reduced in a meticulous manner to suppress the temperature increase. It is possible to more effectively reduce the power consumption and temperature increase of the whole optical disc apparatus 100.

(b) of FIG. 3 is a light emission timing diagram when the rotation of an optical disc is started. Prior to focusing control, the laser light emitting portion 1 is switched ON with the basic timing. An interval T3b1 is a timing for focusing control. In order to improve the accuracy of focusing, sampling pulses represented by arrows are added. The sampling pulses represented by the arrows are used to cause the laser light emitting portion 1 to perform light emission to carry out a sampling operation at timings other than the basic timing. The sampling pulse is incorporated into the PL signal. When focusing control is performed, the light emission period is shorter than when the focusing control is not performed. Thereby, it is possible to obtain the FE signal, the TE signal, the total light amount signal, and the like with high speed and accuracy. An interval T3b2 is a tracking control interval, in which sampling pulses represented by arrows in a manner similar to the focusing control are added. Thus, the laser control portion 104 causes the light emission period of the laser light emitting portion 1, when the focusing control and the tracking control are performed, to be shorter than the light emission period of the laser light emitting portion 1, when the focusing control and the tracking control are not performed. Thereby, it is possible to perform an intermittent idling operation during an actuating operation and perform the focusing control and the tracking control without error.

(c) of FIG. 3 is a light emission timing diagram during a jumping operation. Sampling pulses represented by arrows are added to jumping intervals T3c1 and T3c2, thereby enhancing the detection precision of the TE signal and the control frequency band to obtain a stable jumping operation. In the above description, during the simple idling, operations are performed at basic timings. During a jumping operation in an actual STON operation, an idling operation can be stabilized by adding sampling pulses shown in (c) of FIG. 3.

(d) of FIG. 3 is a light emission timing diagram when vibration is detected during idling. The optical disc apparatus 100 may further comprise a vibration detecting portion for performing at least one of detection and prediction of the vibration level of the optical disc apparatus 100 (e.g., a vibration/temperature detecting portion shown in FIG. 7), thereby detecting vibration, or detecting vibration based on the error of the FE signal or the TE signal. When the vibration level is equal to or more than a prescribed value, sampling pulses represented by arrows in an interval T3d are added, thereby increasing a control frequency for focusing and tracking to prevent focus skipping or track skipping. In addition, when the vibration level is greater than the prescribed value, the OFF interval is removed and the ON state is continued, so that the sampling intervals of the FE signal and the TE signal are shortened while the control frequency for the focusing control and the tracking control is further increased. Thereby, a control function for vibration can be improved. For example, the light emission period is reduced to ½, ⅓, ¼, ... of the basic timing period, depending on the vibration level. When the vibration level is equal to or greater than a prescribed level, the laser control portion 104 causes the light emission period of the laser light emitting portion 1 to be shorter than when the vibration level is less than the prescribed level, or causes the laser light emitting portion 1 to perform continuous light emission. Thereby, it is possible to provide an optical disc apparatus having a high level of operation reliability under vibration conditions while performing intermittent idling.

(e) of FIG. 3 is a light emission timing diagram showing that a defect is found during idling. During idling, since the focus is located on the same track, it is possible to detect a defect from the FE signal or the TE signal by, scanning during one revolution. From the next revolution, focusing and tracking are controlled to avoid the defect. In the diagram, a defect interval is designated T3e2, in which the FE signal and the TE signal need not to be detected, so that the laser light emitting portion 1 is switched OFF. To T3e1 and T3e3 before and after the defect interval, respectively, sampling pulses represented by arrows are added. Before the defect, the number of sampling points is increased so as to enhance control precision. During the defect interval, the hold state Ls taken. In this case, a specialized memory storing the absolute position of a focusing or tracking point is used to correct the displacement in the hold state. After passing through the defect, the number of sampling points is increased during a constant interval designated T3e2 so as to suppress the displacement quickly and stably.

(f) of FIG. 3 is a light emission timing diagram showing a seeking operation. In this diagram, seeking is performed during intervals T3f1 to T3f3. During seeking, tracking control to not performed, and the optical head portion 103 is moved in accordance with a prescribed speed profile. The reason an ON interval is added is that the number of guide grooves is accurately counted from the TE signal during seeking. During the intervals T3f1 and T3f3 corresponding to acceleration and deceleration, respectively, a change in the TE signal is detected by switching ON pulses in a manner corresponding to the moving speed. When the moving speed is high, the laser control portion 104 causes the laser light emitting portion to perform continuous light emission during the interval T3f2. Thereby, it is possible to detect a change in the TE signal with high speed. Of course, since the period of the TE signal is long, if the moving speed is equal to or less than a prescribed value, a seeking operation can be performed by switching ON pulses only during a period in which the TE signal can be generated. During seeking, focusing control can be performed at basic timings, in principle. Actually, there is an influence of a groove crossing signal or the like. By obtaining and treating the TE signal at increased sampling points appropriately, tracking control precision can be improved. Thereby, it is possible to perform an intermittent idling operation during a seeking operation, and tracking control without error.

(g) of FIG. 3 is a light emission timing diagram when address information is read out. As described above, addresses are previously recorded on the optical disc 101 by wobbling guide grooves. In a reading preparation operation for performing preparation for reading address information from the optical disc 101, the laser light emitting portion 1 emits light during the light emission period of the basic timing. In a reading operation for reading address information from the optical disc 101 (T3g interval), in order to adequately detect the wobbling state of a guide groove, the laser light emitting portion 1 is caused to emit light in such a manner that the light emission period is shorter than a wobbling period. To achieve this, sampling pulses represented by arrows are added to the basic timing, and the light emission to performed during the resultant light emission period to read address information. Thereby, it is possible to perform an intermittent idling operation during an address information reading operation and perform the address information reading operation without error. Note that the light emission period is determined depending on a method for forming address information. When the wobbling frequency is as high as 1 MHz, continuous light emission may be performed, taking into account the stability of the laser light emitting portion 1.

(h) of FIG. 3 is a light emission timing diagram when information, such as user data or the like, is reproduced. In a first reading preparation operation (interval T3h1) for reading information from the optical disc 101, the laser light emitting portion 1 emits light during the light emission period of the basic timing. A second reading preparation operation (interval T3h2) for reading information from the optical disc 101, is an address information reading operation for specifying a region in which information to be reproduced is recorded, and is the same as the operation of (g) of FIG. 3. The light emission period of the interval T3h2 is shorter than the light emission period of the basic timing. In a reading operation (interval T3h3) for reading information from the optical disc 101, the laser light emitting portion 1 is continuously ON. During the interval T3h3, a high frequency module (FIG. 5) for reducing noise generated by light reflected from the optical disc 101 is also operated. Focusing control and tracking control are caused to be more precise by enhancing the control frequency when idling is transitioned to address reading and the address reading is then transitioned to information reproduction.

(i) of FIG. 3 shows light emission timing when information, such as user data or the like, is recorded. In a first recording preparation operation (interval T3i1) for perform preparation for recording information onto the optical disc 101, the laser light emitting portion 1 emits light during the light emission period of the basic timing. A second recording preparation operation (interval T3i2), for performing preparation for recording information onto the optical disc 101, is an address information reading operation for specifying a region in which information is to be recorded and is the same as the operation of (g) of FIG. 3. The light emission period of the interval T3i2 is shorter than the light emission period of the basic timing. In a recording operation (interval T3i3) for recording information onto the optical disc 101, the recording control portion 105 switches the mode of the laser control portion 104 to a recording mode. In the recording mode, multi-pulses having multiple recording power levels are used to drive the laser light emitting portion 1 so as to emit laser light having a power optimum to the optical disc 101. During recording, the most precise control function is generally required. Therefore, the FE signal, the FE signal, and the RP signal are detected by appropriate signal processing with high speed and high precision, and a servo control and an address information reading operation are performed in parallel. During information recording, the high frequency module is not operated. Note that the high frequency module may not be operated in the above-described reading preparation operation and recording preparation operation. Thereby, it is possible to suppress the power consumption of the high frequency module in a reading preparation operation and a recording preparation operation, and the temperature increase of the laser light emitting portion 1 close to the high frequency module.

Note that the high frequency module may not be operated during an interval in which the laser light emitting portion 1 does not emit light. In this case, it is possible to suppress the power consumption of the high frequency module during an interval in which the laser light emitting portion 1 does not emit light, and the temperature increase in the laser light emitting portion 1 close to the high frequency module.

The laser control portion 104 causes the laser light emitting portion 1 to perform intermittent light emission so as to perform tracking control and focusing control when waiting for the execution of information reproduction or recording. In this case, the light emission period is longer than the light emission period during which reproduction or recording is performed. Thereby, it is possible to effectively reduce the power consumption and the temperature increase of the whole optical disc apparatus when waiting for the execution of reproduction or recording.

Note that the above-described light emission timing is the same as the PL signal timing, except for the recording period. As described above, the PL signal is an OR of the PA signal, the PF signal, and the PT signal. Basically, the PA signal is generated only when addresses are read out, and the PF signal and the PT signal are output depending on the state of a servo control or a servo band. Note that these signals are combined depending on the operating state to control the optical disc apparatus 100 optimally. In addition, during seeking, the TE signal detection and the tracking control are not necessarily performed at the same timing. Therefore, the PT signal may comprise a group of signals. In addition, during the recording HIGH interval, the operation modes of the address reproducing portion 113, the focusing control portion 115, and the tracking control portion 116 are determined using a control signal (not shown) which is different from the PA signal, the PF signal, and the PT signal.

In the above-described description of the timing of each operation, an interval in which sampling pulses are added is established for each control operation. However, the laser light emitting portion 1 may perform continuous light emission during such an interval. Despite this, it is preferable to perform switching in a pulse-like manner to reduce power consumption even though the interval is short, in view of the purpose of the present invention.

During intermittent light emission, the high frequency module (HFM) has a short time interval during which the laser light emitting portion 1 is a switched ON. Therefore, basically, the HFM is not operated. The HFM may not be operated during the stopping interval, and therefore, is stopped. Note that when the HFM is operated during an interval in which the laser light emitting portion 1 is switched ON, the laser light emitting portion 1 needs to be driven earlier by a response time of the HFM. During continuous light emission, except for the information reproduction time, the HFM is operated only when required depending on the function of the laser light emitting portion 1 and the operation mode. For the laser light emitting portion 1 during intermittent idling, there may be an undesirable power difference within a pulse due to mode hopping or for each pulse. Such a portion is reduced by the AGC technique for normalizing a detecting signal based on the total light amount.

Again, it is necessary to enhance the control precision of focusing and tracking during address reading, information reproduction and information recording. To achieve this, the sampling periods of the FE signal and the TE signal are increased, and the control frequency band is increased. Particularly, during recording/reproduction, a normal continuous servo control is performed.

In addition, during an interval in which the laser light emitting portion 1 is OFF, the power consumption of a relevant detection system may be reduced, thereby making it possible to provides an optical disc apparatus 100 having low power consumption.

In addition, during the above-described basic idling, the tracking control remains. However, in a ROM disc having prepits, in which the laser light emitting portion 1 needs to perform continuous light emission so as to obtain the TE signal, the tracking control may be stopped and only the focusing control is performed during idling. Alternatively, when the idling time is long to some extent until a recording/reproduction operation, the apparatus 100 may be temporarily transitioned to the second idling state, a tracking control may then be performed before a recording/reproduction operation, and the above-described information recording operation or information reproduction operation may then be performed. In addition, when awaiting time for the execution of recording or reproduction is long to some extent, a tracking control may be stopped so that power consumed by the tracking control may be reduced.

FIG. 4 shows a series of control operation timings when information recording/reproduction is performed. It is indicated how data is reproduced or recorded depending on the combination of the control operations of FIG. 3.

(a) of FIG. 4 shows a series of steps for information reproduction. As shown in an operating state, steps are stop, actuation, address read, seek, address read (for confirming seek), idling, seek, address read (for confirming a reproduction track), information reproduction (read), idling, and stop, from left to right. The control state of the laser light emitting portion 1 during each operation is represented by a pattern of the operating state. The specific switching control is shown in FIG. 3. During an interval T4a when performing information reproduction, continuous light emission is performed.

(b) of FIG. 4 shows a series of steps for information recording. As shown in an operating state, steps are stop, actuation, address read, seek, address read (for confirming seek), idling, seek, address read (for confirming a recording track), information recording (write), idling, and stop, from left to right. The control state of the laser light emitting portion 1 during each operation is represented by a pattern of the operating state. The specific switching control is shown in FIG. 3. During an interval T4b when performing information recording, light emission is performed using the write strategy.

As described above, a seeking operation is performed twice before both data reproduction and recording. The first seeking and the subsequent address reading and idling are performed so as to place the optical head portion 103 near a track to be recorded or reproduced in advance to shorten the time required until the start of recording/reproduction. Therefore, when the optical head portion 103 is already located near a track to be recorded, these three steps are not necessarily required. The above-described information reproduction steps are applicable to reproduction of data other than user data, such as control data for actuating the optical disc apparatus 100, management data for replacement, key information for copyright, and the like. Similarly, the information recording steps are applicable to relevant information other than user data.

The above-described information reproduction steps and information recording steps can be performed for each unit of information reproduction and information recording operations when a stop-type intermittent operation is required.

Basically, when it is predicted or known that a recording/reproduction operation is performed in prescribed intervals or less, an intermittent idling operation without stop and the recording/reproduction operation are controlled to be repeated, irrespective of the application. Particularly, the optical disc apparatus 100 may be used as a typical PC peripheral. In this case, when no access occurs in a prescribed time, the operation is temporarily stopped (sleep operation). When a request for recording/reproduction is received, the optical disc apparatus 100 is operated again and the above-described data recording/reproduction steps are performed without a stop operation, including an intermittent idling operation. In addition, an extended command for specifying an idling state may be prepared as a PC command so as to explicitly specify an intermittent idling operation or a stop operation so that the optical disc apparatus 100 can be controlled by a host. In this case, more appropriate low power consumption processing can be achieved as a system.

The optical disc apparatus 100 of Embodiment 1 is an apparatus having an ATAPI interface, which is incorporated in a PC. The present invention to not limited to this. The optical disc apparatus 100 may be an apparatus external to a PC, which has a serial interface, such as USB, IEEE1394, or the like.

Embodiment 2

In Embodiment 2, operations of the optical head portion 103, the laser control portion 104, the signal generating portion 112, and the like of the optical disc apparatus 100 will be further described.

Figure 5:
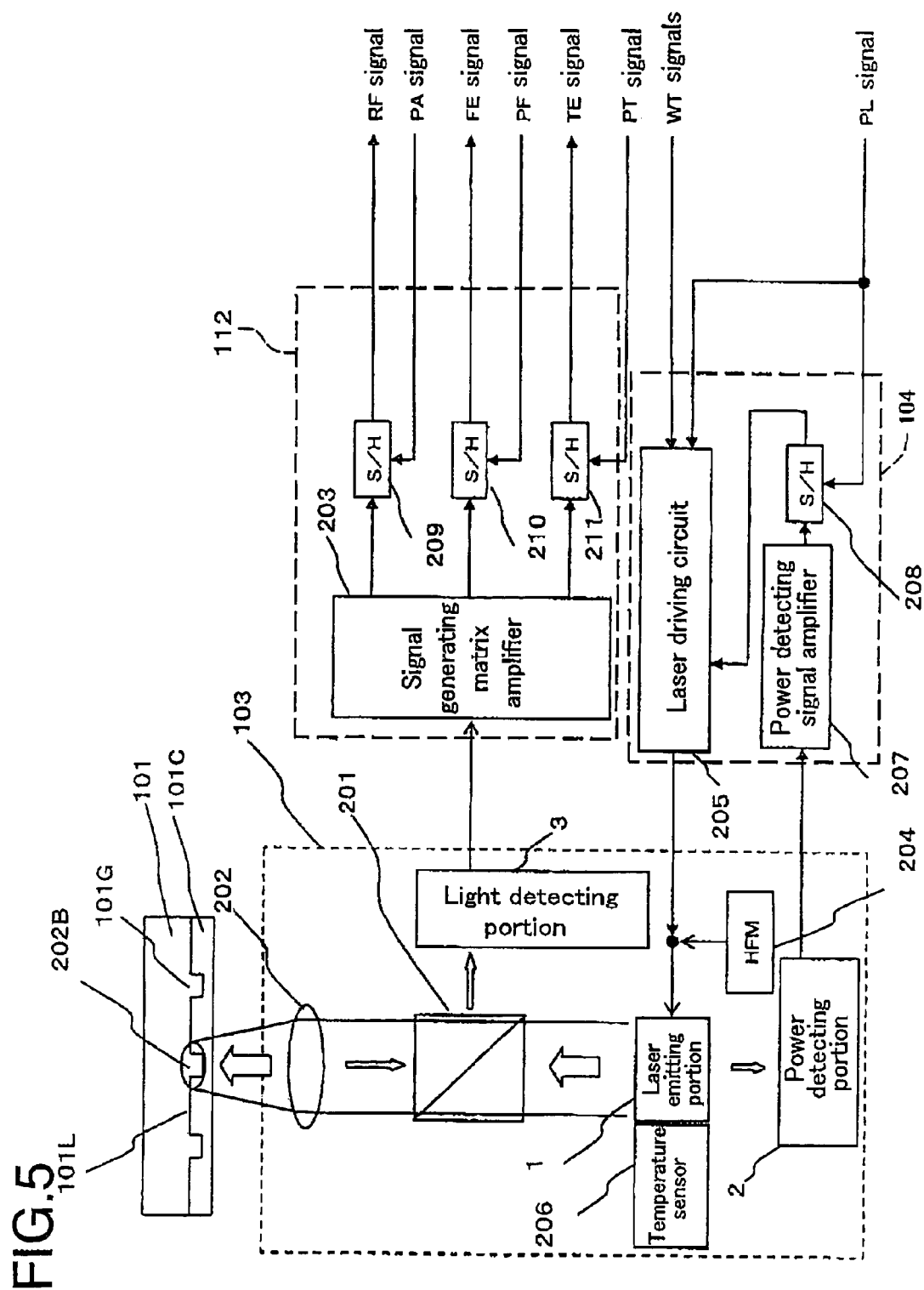
FIG. 5 is a diagram showing a configuration of an optical head portion and peripheral paths thereof of an optical disc apparatus according to Embodiment 2 of the present invention.
Figure 6:
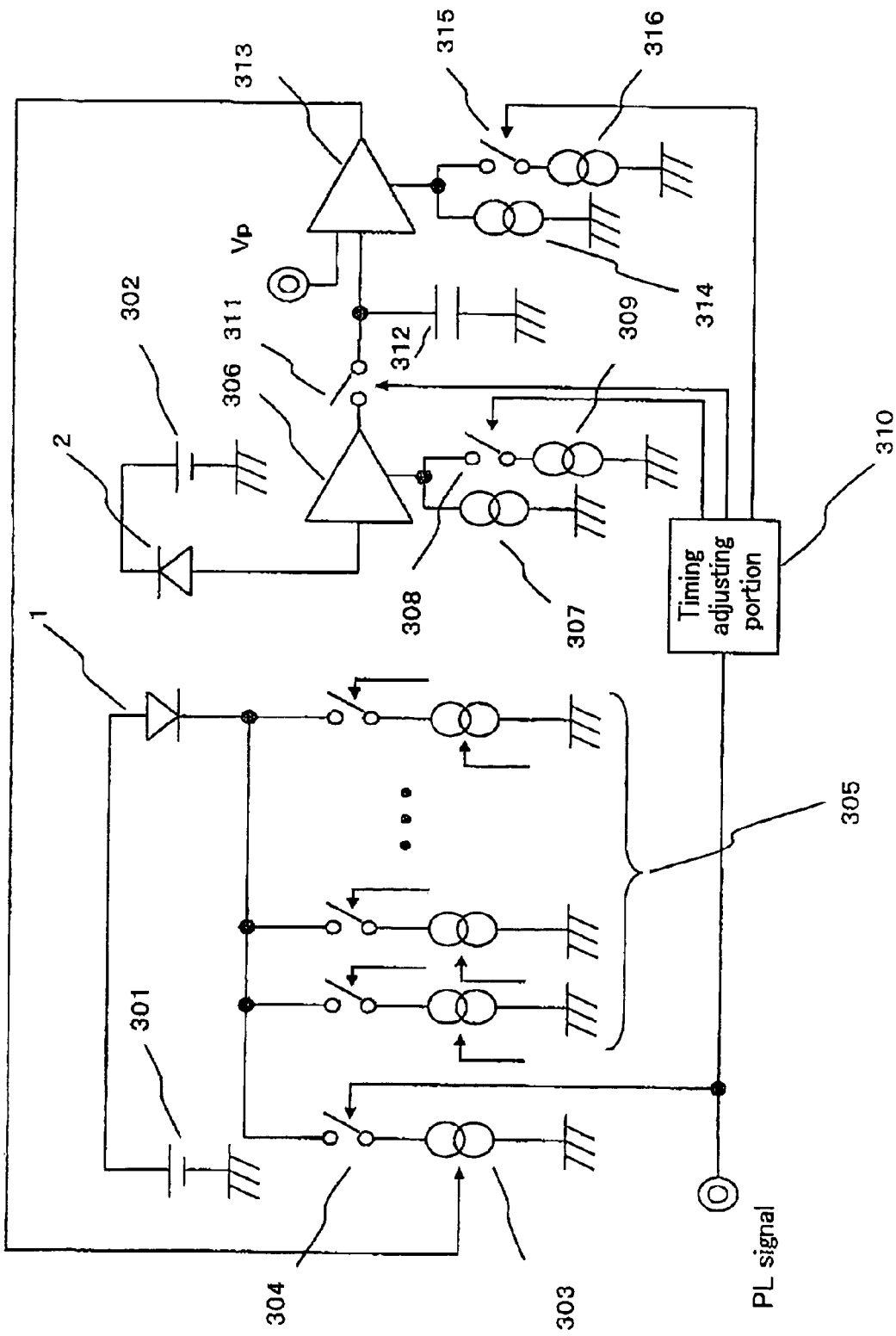
FIG. 6 is a diagram showing a configuration of a laser driving portion of the optical disc apparatus of Embodiment 2.

FIGS. 5 and 6 are diagrams showing the optical head portion 103 and the laser control portion 104, and their peripheral components. The optical disc apparatus 100 of Embodiment 2 is devised to comprise some components similar to those of conventional optical disc apparatuses and perform the intermittent idling of the present invention. Therefore, it is possible to reduce the time period required for the development of an optical disc apparatus and the manufacturing cost.

In FIG. 5, the same components as those of FIG. 1 have the same numeral numbers. The optical disc 101 comprises a substrate, a recording film, and a cover layer 101C. Grooves (guide grooves) 101G and lands 101L between each groove are formed in the recording film. The cover film 101C has a thickness of, for example, 0.1 mm. The recording film is covered with the cover film 101C. The track pitch is, for example, as small as 0.32 μm. Address information is previously recorded by the groove 101G being shifted to the right-hand or left-hand direction (wobbling).

The optical head portion 103 comprises a laser light emitting portion 1, a power detecting portion 2, a light detecting portion 3, a beam splitter 201, an objective lens 202, a high frequency module 204, and a temperature sensor 206. The signal generating portion 112 comprises a signal generating matrix amplifier 203, and sample/hold circuits (S/H) 209, 210, and 211. The laser control portion 104 comprises a laser driving circuit 205, a power detecting signal amplifier 207, and a sample/hold circuit (S/H) 208.

The laser light emitting portion 1 of the optical head portion 103 is a blue-violet laser having a wavelength of about 405 nm. Light emitted from the laser light emitting portion 1 is made substantially parallel by a collimator (not shown). The light passes through the beam splitter 201. Thereafter, the light is brought onto the groove 101G via the objective lens 202 having a NA of 0.85, forming a recording/reproduction light beam 202B. The recording/reproduction light beam 202B is proportional to short wavelength and inverse proportional to NA and is focused into a very small area. Therefore, high-density recording/reproduction can be achieved. Specifically, as compared with a DVD for which a red laser having a wavelength of 650 nm and a lens having an NA of 0.6 are used, the diameter is equal to or less than ½, and the recording density is equal to or greater than 4. Light reflected from the optical disc 101 is returned to the objective lens 202, and the light path is changed by the beam splitter 201. The light is input via a detection optical system (not shown) to the light detecting portion 3 comprising a light receiving region having a plurality of patterns. Information detected by the light detecting portion 3 is input to the signal generating matrix amplifier 203.

The laser light emitting portion 1 is driven in parallel by the high frequency module (HFM) 204 and the laser driving circuit 205 external to the optical head portion 103. Typically, the optical disc apparatus 100 also drives the HFM 204 when the laser light emitting portion 1 performs continuous light emission during a recording/reproduction preparation operation. In Embodiment 2, basically, the HFM 204 is assumed to be driven during information reproduction. The output power of the laser light emitting portion 1 is detected by the power detecting portion 2. In FIG. 5, the power is detected based on light output from a surface of the laser light emitting portion 1 opposite to the light outputting surface. Alternatively, a portion of emitted light may be introduced into the power detecting portion 2 to detect the power (front light detection). The temperature sensor 206 is used to measure the package temperature of the laser light emitting portion 1. Particularly, the temperature sensor 206 is provided so as to change a method for reducing power consumption or controlling recording/reproduction, or alerting the apparatus user, depending on the temperature range of the laser light emitting portion 1 with respect to the upper limit of the guaranteed operating temperature (60° C. to 70° C.). For example, when the temperature of the laser light emitting portion 1 is lower than the operation guaranteeing temperature by a prescribed value or more, the period of the PL signal can be shortened so that the sampling periods of the FE signal and the TE signal are shortened, while the control frequency bands of the focusing control and the tracking control can be increased so that the control performance is improved. Thus, when the temperature of the laser light emitting portion 1 is lower than the operation guaranteeing temperature by a prescribed value or more, the laser control portion 104 causes the light emission period of the laser light emitting portion 1 to be shorter than when the temperature of the laser light emitting portion 1 is not lower than the operation guaranteeing temperature by a prescribed value or more. Even when the temperature of the laser light emitting portion 1 is lower than the operation guaranteeing temperature, it is possible to provide an optical disc apparatus which can operate reliably while performing intermittent idling.

The power detecting signal detected by the power detecting portion 2 is amplified by the power detecting signal amplifier 207, and fed back via the sample/hold circuit (S/H) 208 to the laser driving circuit 205. The S/H 208 samples the power detecting signal when the PL signal is HIGH, and holds the power detecting signal when the PL signal is LOW. Thereby, a power control is performed using the power detecting signal when the laser light emitting portion 1 is ON. The PL signal is also input to the laser driving circuit 205, so that the ON/OFF of the laser light emitting portion 1 is controlled. During information reproduction, the laser driving circuit 205 maintains the PL signal HIGH and causes the laser light emitting portion 1 to perform continuous light emission. In addition, during information recording, WT signals are used to output pulse-like recording power suitable for writing strategy.

The RF signal, the FE signal, and the TE signal are obtained from the signal generating matrix amplifier 203 via the sample/hold circuits (S/H) 209, 210, and 211, respectively. The S/H 209 samples the RV signal which is obtained during the ON state of the laser light emitting portion 1 using the PA signal during address reproduction when recording/reproduction is prepared. The S/H 210 samples the FE signal which is obtained during the ON state of the laser light emitting portion 1 using the PF signal during focusing control when recording/reproduction is prepared. The S/H 211 samples the TE signal which is obtained during the ON state of the laser light emitting portion 1 using the PT signal during a tracking control when recording/reproduction is prepared and during counting of grooves when a seeking operation is performed. During information reproduction and information recording, the PA signal, the PF signal, and the PT signal are consistently HIGH, so that sampling is consistently performed, thereby improving address reading, focusing, and tracking control performance. The PL signal is generated by an logical addition (OR) of the PA signal, the PF signal and the PT signal as in Embodiment 1.

Thus, in Embodiment 2, the intermittent idling of the present invention can be simply achieved only by adding a sample/hold circuit (S/H) to a control circuit of a typical optical disc apparatus.

Note that a signal is separately detected during a non-light emission interval in which a laser light emitting portion is OFF, and circuit offset, drift, optical system offset are cancelled from the sampled/held RF signal, FE signal and TE signal, thereby making it possible to improve detection control performance. It is preferable that the laser light emitting portion detects an AS addition signal and an AGC processing is performed for the FE signal and the TE signal.

FIG. 6 shows a more concrete configuration of the laser control portion 104 and its peripheral portion. In FIG. 6, the laser light emitting portion 1 and the power detecting portion 2 are each represented by a diode symbol. Reference numerals 301 and 302 indicate power sources. A current source 303 is used to determine the reproduction power current of the laser light emitting portion 1, and is switched ON/OFF by a switch 304 which is controlled by the PL signal. A recording current control portion 305 comprises current sources for determining the recording power of the laser light emitting portion 1 and switches connected to the respective current sources. The details of a recording operation are omitted. However, during recording, the switch 304 is switched OFF, and the recording current control portion 305 generates multipulses having multiple recording power levels, and the laser light emitting portion 1 emits light based on the multipulses.

An amplifier 306 amplifies the power detecting current of the power detecting portion 2. The amplifier 306 is driven by a current source 307 for providing a stationary current and a current source 309 which is switched ON/OFF using a switch 308. When the PL signal is HIGH, the switch 308 is switched ON using a signal adjusted by a timing adjusting portion 310. Thereby, the operation frequency band of the amplifier 306 is increased only during an interval when the laser light emitting portion 1 is ON. When the PL signal is LOW, only a current output from the current source 307 is provided to the amplifier 306, thereby reducing current consumption.

A switch 311, a capacitor 312, and an amplifier 313 function as a sample/hold circuit and an error amplifier. When the PL signal is HIGH or LOW, the switch 311 is ON or OFF, respectively. A power detecting signal is sampled to the capacitor 312 when the laser light emitting portion 1 is ON. A power detecting signal is held when the laser light emitting portion 1 is OFF. A control signal for the switch 311 is adjusted by the timing adjusting portion 310 so that a power detecting signal is sampled only when the laser light emitting portion 1 emits light. The output of the amplifier 313 is fed back to a current source 303 so that the voltage value of the sampled/held signal is the same as the value of Vp which is a reproduction power reference voltage. Thereby, a light emission power control is performed. As with the amplifier 306, the amplifier 313 is switched ON/OFF by a current source 314 for providing a stationary current and a current source 316 which is switched ON/OFF by a switch 315. When the PL signal is HIGH, the switch 315 is turned ON using a signal adjusted by the timing adjusting portion 310. As a result, the operation frequency band of the amplifier 313 is HIGH only when the power detecting signal is sampled during an interval in which the laser light emitting portion 1 is ON. When the PL signal is LOW, only a current output by the current source 314 is supplied to the amplifier 313, thereby reducing current consumption.

Thus, in the circuit configuration of FIG. 6, the current consumption of the amplifying portion and the sampling/holding portion for a power detecting signal is reduced when the laser light emitting portion is OFF. Thereby, portions other than the laser light emitting portion have low power consumption.

In addition, in the signal generating matrix amplifier 203 or the S/H's 209, 210 and 211 of FIG. 5, current consumption is controlled when the laser light emitting portion 1 is ON or OFF, as in the amplifiers 306 and 313, so that average current consumption may be reduced. Thereby, it is possible to obtain the optical disc apparatus 100 having lower power consumption.

In order to obtain a small-size, low-noise, and high-performance optical disc apparatus, the above-described light detecting portion 3, the signal matrix amplifier 203, and the like may be integrated together as an OEIC(Opto-Electronic Integrated Circuit). In this case, the above-described S/H's 209 to 211 are also integrated with the OEIC, thereby making it possible to achieve the intermittent idling of the present invention. In addition, the OEIC is provided on the optical head portion 103, so that the power consumption of an amplifier mounted on the optical head portion 103 can be reduced as with the laser light emitting portion 1. Therefore, it is possible to suppress the power consumption and the temperature increase of the optical head portion 103. Moreover, it is possible to obtain a compact optical disc apparatus capable of an intermittent idling operation.

Note that a power detecting system (the power detecting portion 2, the amplifier 306 and the amplifier 313 in FIG. 6) may be further integrated with the OEIC. In addition, a chip of the laser light emitting portion 1 may be bonded onto the OEIC, and therefore, a light detecting optical system or the like is integrated with the OEIC to form an integrated optical module. Thereby, the intermittent idling function can be widely provided. Note that it is difficult to integrate a laser driving circuit having a high power and a high-speed operation with the OEIC. Such a laser driving circuit may be made on a separate chip from the OEIC, and is desirably placed at a position which allows the chip to have a less influence of temperature within the range which secures the performance. A progress in manufacturing technology would allow the laser driving circuit to be integrated within the OEIC.

Embodiment 3

Figure 7:
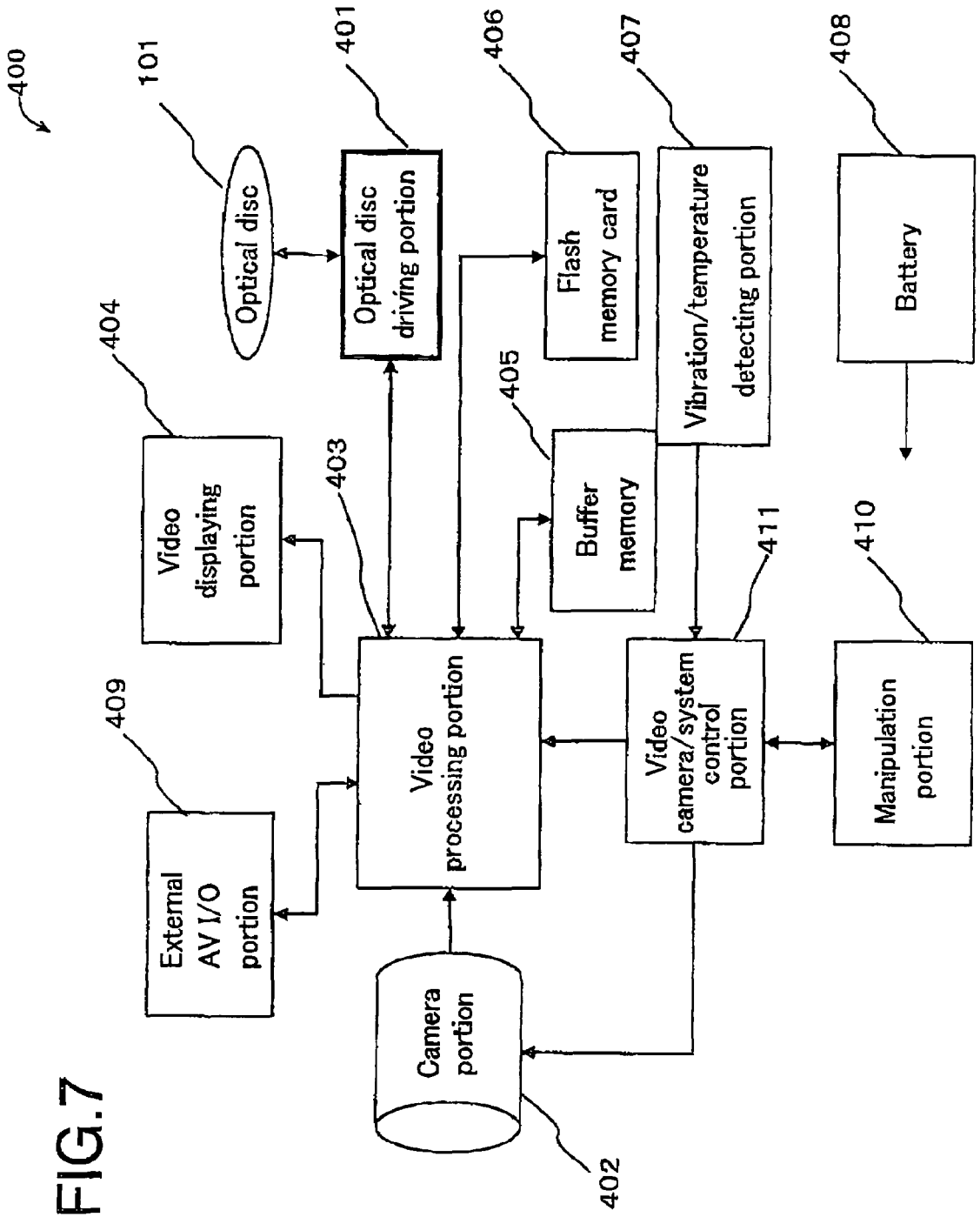
FIG. 7 is a block diagram showing an optical disc apparatus with a video camera function according to Embodiment 3 of the present invention.

FIG. 7 is a block diagram showing a video camera apparatus 400 comprising an optical disc driving portion according to Embodiment 3 of the present invention. This video camera apparatus 400 may be called an optical disc apparatus with a video camera function.

The intermittent idling of the present invention is particularly effective when video data is compressed and recorded onto an optical disc. This is because even when a data processing rate is close to a writing rate to an optical disc, it is possible to achieve low power consumption and suppress the temperature increase without stopping the operation of an optical disc apparatus. According to the embodiment, it is possible to provide a convenient video camera apparatus which utilizes the random accessibility of optical discs and has an excellent level of temperature resistance.

The video camera apparatus 400 comprises an optical disc driving portion 401, a camera portion 402, a video processing portion 403, a video displaying portion 404, a buffer memory 405, a vibration/temperature detecting portion 407, an external AV I/O portion 409, a manipulation portion 410, and a video camera/system control portion 411. The video camera apparatus 400 also carries a flash memory card 406 and a battery 408.

An optical disc 101 is mounted into the optical disc driving portion 401. The optical disc driving portion 401 comprises components similar to those of the optical disc apparatus 100 which performs the above-described intermittent idling. The optical disc driving portion 401 is records video information and audio information onto the optical disc 101 and reproduces video information and audio information from the optical disc 101.

The camera portion 402, which generates video information indicating video from incident light, comprise B a lens and a CCD for taking video, a microphone for taking audio, and the like. Video information and audio information output by the camera portion 402 are subjected to compression and decompression in the video processing portion 403. At the same time, the video displaying portion 404 comprising an LCD displays video indicated by video information. Compressed video information and audio information are temporarily accumulated in the buffer memory 405, and thereafter is successively transferred to the optical disc driving portion 401. The data compression processing rate is assumed to be slower than a rate at which the optical disc driving portion 401 records video information and audio information onto the optical disc 101. Recording of video information and audio information onto the optical disc 101 is performed alternately between an interval for writing information and an interval in which writing is stopped (waiting state interval), i.e., intermittent operation. The intermittent idling of the present invention reduces power consumption during the waiting state interval.

Concerning a recording operation, the buffer memory 405, a buffer memory incorporated in the optical disc driving portion 401, and the flash memory card 406, which can be incorporated or detachable, are combined to manage the quantity of data which is temporarily stored so as to prevent skipping of video/audio. Particularly, when the vibration/temperature detecting portion 407 detects vibration/impact and it is determined that the control operation of the optical disc driving portion 401 cannot be maintained, or when the vibration/temperature detecting portion 407 detects a high temperature of the optical head portion and it is determined that the operation of the laser light emitting portion cannot be guaranteed, the optical disc driving portion 401 is stopped if the recording operation cannot be continued and data overflows from the buffer memory. In this case, compressed data is temporarily stored in the flash memory card 406. When the optical disc driving portion 401 operates normally, the optical disc driving portion 401 is operated to record data into a position of the optical disc 101 to which the data was originally to be recorded.

The flash memory card 406 is a non-volatile memory. The flash memory card 406 may be used to store management data, which needs to be recorded onto the optical disc 101, in parallel to the optical disc 101. Therefore, it is possible to backup management data, which failed to be written onto the optical disc 101L due to a voltage reduction, depletion, or detachment of the battery 408. Subsequently, when the battery 408 is recovered or attached so that the optical disc driving portion 401 can be operated again, the backup information can be written onto the optical disc 101 so that the data can be securely maintained. In this case, in order to prevent the loss of the consistency of data due to the detachment of the optical disc 101 or the flash memory card 406, the ID number or the recording time of the optical disc 101 or the flash memory card 406, or the ID number of the optical disc driving portion 401, or the like may be simultaneously recorded, thereby securing data consistency. If the data consistency is likely to be lost, detachment of the optical disc 101 and/or the flash memory card 406 may be prevented by mechanical locking. Such a technique for securing data consistency is also effective.

This apparatus is also designed to record video and audio data from the external AV I/O portion 409 as well as the camera portion 402. Of course, recording is limited in accordance with copyright protection rules. When video and audio are taken or recorded, control of each block is performed via the video camera/system control portion 411. In accordance with the manipulation portion 410 controlled by the user.

Next, a reproduction operation will be described below. A reproduction operation is performed based on the manipulation of the manipulation portion 410. Typically, the contents of the optical disc 101 are displayed as thumbnails on the video displaying portion 404, and the user selects the thumbnail to reproduce a moving image. Compressed data is read out from the optical disc 101, and is then accumulated in the buffer memory 405. If the accumulated data reaches a prescribed amount, the data is subjected to a decompression operation in the video processing portion 403. The recorded video and audio data is output to the video displaying portion 404 and is also output to an external TV via the external AV I/O portion 409. In the case of reproduction, the data input rate to the video processing portion 403 is slower than the reading rate from the optical disc 101. Therefore, during reproduction, compressed data read from the optical disc 108 is temporarily accumulated in the buffer memory 405, while compressed data is continuously supplied from the buffer memory 405 to the video processing portion 403. However, the information reproduction operation from the optical disc 101 is temporarily stopped when the buffer memory 405 is about to overflow. When the reproduction operation is stopped, the optical disc driving portion 401 is in the waiting state using intermittent idling. Thereby, power consumption is reduced. When a prescribed amount of free space is created in the buffer memory 405, the reproduction operation is operated again. Thus, burst-like intermittent reproduction is performed in a manner similar to that of the above-described recording operation.

The above-described optical disc apparatus with a video camera function is generally housed within a small housing. The power consumption of each block increases the temperature inside the housing. Therefore, appropriate heat dissipation is required. Particularly, as described above, the temperature increase of the laser light emitting portion is critical in determining the operating temperature and reliability of the apparatus. Therefore, by applying the intermittent idling of the present invention to the optical disc driving portion 401, it is possible to efficiently reduce power consumption of the laser light emitting portion and other peripheral circuits, and suppress the temperature increase. In Embodiment 3, the effect of intermittent idling is particularly great in the video camera apparatus 400 (an optical disc apparatus with a video camera function).

Although the apparatus of Embodiment 3 is an optical disc apparatus with a video camera function, the present invention is not limited to this. The present invention is also applicable to an optical disc apparatus with an audio specialized function, a data collecting function, or the like.

In Embodiments 1 to 3, it may be assumed that error signals at sampling points have poor quality, so that low frequency sampling is not satisfactorily controlled. In this case, tracks to be subjected to STON are previously tested by performing continuous light emission. Thereafter, a track without a point having poor quality is used to perform intermittent idling or a point to be irradiated is determined in a manner that avoids defect points. Thus, intermittent idling may be maintained using only satisfactory FE and TE signals. Quality inspection of error signals is performed by checking whether or not the FE or TE signal is disturbed due to a defect or dust on a disc. In some cases, tracks to be accessed after intermittent idling are previously determined, and it is desirable to continue STON on defective tracks having a prescribed length or less. In this case, error signals in a defective interval may be held in the case of STON during intermittent idling, as described above.

In the above-described embodiments, the laser light emitting portion, which is of a CAN type, is placed to a position separated from an OEIC. In the case of a hyper small head using a so-called integrated module in which a laser light emitting portion, an OEIC, an optical system, and the like are integrated together, the present invention is particularly effective because heat dissipation is more difficult.

In the above-described embodiments, a current for outputting a normal reproduction power is applied when light emission is performed, while a current supply is cut off when light emission is not performed, by switching ON/OFF a laser light emitting portion. Thereby, the laser light emitting portion is driven in a pulse-like manner to minimize the average current supplied to the laser light emitting portion. However, a light heat bias is applied to the laser light emitting portion during pulse-driving so as to stabilize the performance. Therefore, a small amount of bias current equal to or less than a threshold current may be applied or a prescribed current may be applied only during a specific interval in the stopping interval. In addition, in order to reduce noise in a drive current, the current may be changed in an analog manner as well as by controlling the through rate of the current, thereby making it possible to obtain the inherent effect of the present invention.

The optical disc described in the embodiment above is an optical disc having a continuous groove, such as representatively MD, DVD-R, Blu-ray, and the like. However, for sample servo type optical discs, once a pit interval to be subjected to a servo control is specified, a laser light emitting portion is switched ON only for such an interval. Therefore, sample servo type optical discs are particularly suitable for the present invention. Further, in the sample servo type, if address information is contained in a pit interval to be subjected to a servo control, the laser light emitting portion is caused to emit light when the focus passes through the pit interval to be subjected to a servo control. In this case, it is possible to perform idling while reading addresses. In the case of optical discs having a sector structure, such as PD, DVD-RAM, or the like, the laser light emitting portion is caused to perform continuous light emission for address information recording intervals, and perform flickering for data recording intervals. Thereby, the inherent effect of the present invention is obtained.

When a TE signal can be obtained only by impinging flickering light onto prepits on a ROM disc, the intermittent idling of the present invention can be performed without modification. However, when TE is not precisely detected unless a disc is continuously irradiated to some extent (e.g., phase difference TE detection), it is possible to wait for the execution of recording and reproduction in a preparation state in which intermittent idling is performed only for a focusing control.

In addition, the intermittent idling of the present invention is applicable to any optical disc apparatus irrespective of the type of the optical disc and the wavelength of a laser light emitting portion.

According to the present invention, a laser light emitting portion is caused to emit light with a first period during a first operation, and light with a second period during a second operation. The first period and the second period are different from each other. By adjusting a light emission period of the laser light emitting portion depending on each operation, it is possible to perform each operation reliably and suppress the temperature increase and power consumption of the laser light emitting portion. In addition, the temperature increase of the laser light emitting portion can be suppressed and the driving time of the laser light emitting portion can be shortened, thereby making it possible to extend the life span of the laser light emitting portion.

According to the present invention, by intermittently pulse-driving the laser light emitting portion during a preparation operation for recording or reproduction of the optical disc apparatus, it is possible to dramatically reducing the power consumption of, the laser light emitting portion to substantially zero (1% or less of the power consumption during continuous light emission). Therefore, particularly in an optical disc apparatus in which information is intermittently recorded or reproduced, the laser light emitting portion is used substantially only when recording or reproduction is performed. Thereby, it is possible to minimize the temperature increase of the laser light emitting portion. As a result, the optical disc apparatus of the present invention or an apparatus incorporating the same can be used under high temperature atmosphere in which apparatuses, to which the present invention is not applied, cannot be used. In another aspect of this feature, when used in the same ambient temperature, the life span of the laser light emitting portion can be extended, because the optical disc apparatus of the present invention can suppress the temperature increase of the laser light emitting portion.

Further, according to the present invention, the life span of the laser light emitting portion can be extended in terms of the working time of the laser light emitting. Generally, optical disc apparatuses require a period of time for a preparation operation for recording or reproduction before and after recording or reproduction. By performing intermittent idling during the preparation operation, it is possible to stop the driving of the laser light emitting portion during an OFF interval so that the laser light emitting portion is in the non-operating state. Thereby, it is possible to reduce a cumulated operating time of the laser light emitting portion during the preparation operation to substantially a negligible level. The user recognizes that the life span of the laser light emitting portion is significantly extended. In other words, the life span of the optical disc apparatus is substantially determined based on the cumulated time of recording and reproduction operations. The preparation operation time for recording and reproduction has substantially no influence on the life span of an optical disc apparatus. Moreover, according to the present invention, an optical disc apparatus can be maintained in a preparation state for recording or reproduction with low power consumption, and the optical disc apparatus can be quickly transitioned into the recording or reproduction state. Therefore, it is possible to quickly respond to the user's request, such as reproduction of video information from an optical disc, or the like.

Further, according to the present invention, it is possible suppress the power consumption of the laser light emitting portion and other circuits, thereby providing an optical disc apparatus having low power consumption. Particularly, in a battery-driven portable apparatus, the life of the battery can be extended or a smaller battery can be driven for the same duration. Also, it is possible to suppress the temperature increase due to low power consumption, thereby providing a smaller optical disc apparatus.

The present invention reduces the power consumption of an optical disc apparatus and a device carrying the same and secure the operation at higher temperature, while securing the operating reliability and the long life span of a laser light emitting portion.

Thus, the practical effect of the present invention is significant.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disc apparatus, comprising:
a laser light emitting portion for generating laser light for irradiating an optical disc; and
a laser control portion for controlling a light emission operation of the laser light emitting portion,
wherein the laser control portion causes the laser light emitting portion to emit light with a first period during a first operation, and the laser control portion causes the laser light emitting portion to emit light with a second period during a second operation,
the first period and the second period are different from each other, and
values of the first period and the second period are each equal to or less than a value capable of maintaining a focusing control and a tracking control.

2. An optical disc apparatus according to claim 1, wherein in at least one of the first period and the second period, a length of an interval during which the laser light emitting portion emits light is different from a length of an interval during which the laser light emitting portion does not emit light.

3. An optical disc apparatus according to claim 2, wherein the length of the interval during which the laser light emitting portion emits light is shorter than the length of the interval during which the laser light emitting portion does not emit light.

4. An optical disc apparatus according to claim 1, wherein the first operation is a reading preparation operation for performing preparation for reading information from the optical disc, and
the second operation is a reading operation for reading the information from the optical disc.

5. An optical disc apparatus according to claim 1, wherein the first operation is a first reading preparation operation for performing preparation for reading information from the optical disc, and
the second operation is a second reading preparation operation for performing preparation for reading the information from the optical disc.

6. An optical disc apparatus according to claim 1, wherein the first operation is a first recording preparation operation for performing preparation for recording information onto the optical disc, and
the second operation is a second recording preparation operation for performing preparation for recording the information onto the optical disc.

7. An optical disc apparatus, comprising:
a laser light emitting portion for generating laser light for irradiating an optical disc; and
a laser control portion for controlling a light emission operation of the laser light emitting portion,
wherein the laser control portion causes the laser light emitting portion to emit light with a first period during a first operation, and the laser control portion causes the laser light emitting portion to emit light with a second period during a second operation,
the first period and the second period are different from each other,
the first operation is an operation for performing a focusing control and a tracking control when neither a reading preparation operation for performing preparation for reading information from the optical disc nor a reading operation for reading the information from the optical disc is performed, and
the second operation is an operation for performing a focusing control and a tracking control when at least one of the reading preparation operation and the reading operation is performed.

8. An optical disc apparatus according to claim 1, wherein the first period and the second period are each in the range of 250 ms to 500 ms.

9. An optical disc apparatus, comprising:
a laser light emitting portion for generating laser light for irradiating an optical disc; and
a laser control portion for controlling a light emission operation of the laser light emitting portion,
wherein the laser control portion causes the laser light emitting portion to emit light with a first period during a first operation, and the laser control portion causes the laser light emitting portion to emit light with a second period during a second operation,
the first period and the second period are different from each other, and
the laser control portion applies substantially no drive current to the laser light emitting portion during an interval of each of the first period and the second period, wherein during the interval the laser light emitting portion does not emit light.

10. An optical disc apparatus, comprising:
a laser light emitting portion for generating laser light for irradiating an optical disc; and
a laser control portion for controlling a light emission operation of the laser light emitting portion,
wherein the laser control portion causes the laser light emitting portion to emit light with a first period during a first operation, and the laser control portion causes the laser light emitting portion to emit light with a second period during a second operation, the first period and the second period are different from each other, and the laser control portion applies a drive current to the laser light emitting portion during an interval of each of the first period and the second period, wherein the drive current is incapable of causing the laser light emitting portion to emit light, and during the interval the laser light emitting portion does not emit light.

11. An optical disc apparatus according to claim 1, further comprising:

a high frequency module for reducing noise generated by light reflected from the optical disc, wherein an operation of the high frequency module is stopped during an interval in which the laser light emitting portion does not emit light.

12. An optical disc apparatus according to claim 1, further comprising:

a high frequency module for reducing noise generated by light reflected from the optical disc, wherein an operation of the high frequency module is stopped during at least one of a reading preparation operation for performing preparation for reading information from the optical disc and a recording preparation operation for performing preparation for recording information onto the optical disc.

13. An optical disc apparatus according to claim 1, further comprising:

an address reproducing portion for reading address information from a reproduced signal;

a reproduced signal processing portion for demodulating a reproduced signal; and a recording control portion for controlling recording of information onto the optical disc, wherein operations of the address reproducing portion, the reproduced signal processing portion, and the recording control portion are each stopped during idling.

14. An optical disc apparatus according to claim 1, further comprising:

a light detecting portion for generating a reproduced signal based on light reflected from the optical disc; and a signal generating portion for generating a focusing error signal and a tracking error signal by sampling/holing the reproduced signal.

15. An optical disc apparatus according to claim 14, wherein the laser control portion and the signal generating portion are integrated into a single semiconductor chip.

16. An optical disc apparatus according to claim 1, further comprising:

an optical head portion comprising the laser light emitting portion; and a tracking control portion for performing a tracking control, wherein during idling the tracking control portion controls the optical head portion so that a focus of the laser light follows the same track.

17. An optical disc apparatus according to claim 1, further comprising:

an optical head portion comprising the laser light emitting portion; and a tracking control portion for performing a tracking control, wherein during idling an operation of the tracking control portion is stopped.

18. An optical disc apparatus according to claim 1, wherein the first operation is a reading preparation operation for performing preparation for reading address information from the optical disc, and the second operation is a reading operation for reading the address information from the optical disc.

19. An optical disc apparatus, comprising:

a laser light emitting portion for generating laser light for irradiating an optical disc; and a laser control portion for controlling a light emission operation of the laser light emitting portion, wherein the laser control portion causes the laser light emitting portion to emit light with a first period during a first operation, and the laser control portion causes the laser light emitting portion to emit light with a second period during a second operation, the first period and the second period are different from each other, the first operation is a reading preparation operation for performing preparation for reading address information from the optical disc, the second operation is a reading operation for reading the address information from the optical disc, the address information is previously recorded onto the optical disc by wobbling a guide groove contained in the optical disc, and the second period is shorter than a wobbling period of the guide groove.

20. An optical disc apparatus according to claim 1, wherein the laser control portion causes the laser light emitting portion to perform continuous light emission during a seeking operation.

21. An optical disc apparatus, comprising:

a laser light emitting portion for generating laser light for irradiating an optical disc; and a laser control portion for controlling a light emission operation of the laser light emitting portion, wherein the laser control portion causes the laser light emitting portion to emit light with a first period during a first operation, and the laser control portion causes the laser light emitting portion to emit light with a second period during a second operation, the first period and the second period are different from each other, and the laser control portion causes a light emission period of the laser light emitting portion when a focusing control is performed to be shorter than a light emission period of the laser light emitting portion when the focusing control is not performed.

22. An optical disc apparatus according to claim 1, further comprising:

a vibration detecting portion for performing at least one of detection and prediction of a vibration level of the optical disc apparatus, wherein the laser control portion causes a light emission period of the laser light emitting portion when the vibration level is a prescribed level or more to be shorter than a light emission period of the laser light emitting portion when the vibration level is less than the prescribed level.

23. An optical disc apparatus according to claim 1, further comprising:

a vibration detecting portion for performing at least one of detection and prediction of a vibration level of the optical disc apparatus, wherein the laser control portion causes the laser light emitting portion to perform continuous light emission when the vibration level is a prescribed level or more.

24. An optical disc apparatus according to claim 1, further comprising:
   a temperature detecting portion for detecting a temperature of the laser light emitting portion,
   wherein the laser control portion causes a light emission period of the laser light emitting portion when the temperature of the laser light emitting portion is lower than an operation guaranteeing temperature of the laser light emitting portion by a prescribed value or more, to be shorter than a light emission period of the laser light emitting portion when the temperature of the laser light emitting portion is not lower than the operation guaranteeing temperature by the prescribed value or more.

25. An optical disc apparatus, comprising:
   a laser light emitting portion for generating laser light for irradiating an optical disc; and
   a laser control portion for controlling a light emission operation of the laser light emitting portion,
   wherein the laser control portion causes the laser light emitting portion to emit light with a first period during a first operation, and the laser control portion causes the laser light emitting portion to emit light with a second period during a second operation,
   the first period and the second period are different from each other, and
   the laser control portion causes a light emission period of the laser light emitting portion when waiting for execution of reading information from the optical disc, to be longer than a light emission period of the laser light emitting portion when the reading is performed.

26. An optical disc apparatus, comprising:
   a laser light emitting portion for generating laser light for irradiating an optical disc; and
   a laser control portion for controlling a light emission operation of the laser light emitting portion,
   wherein the laser control portion causes the laser light emitting portion to emit light with a first period during a first operation, and the laser control portion causes the laser light emitting portion to emit light with a second period during a second operation,
   the first period and the second period are different from each other, and
   the laser control portion causes a light emission period of the laser light emitting portion when waiting for execution of recording information onto the optical disc, to be longer than a light emission period of the laser light emitting portion when the recording is performed.

* * * * *

UNITED STATES PATENT AND TRADEMARK OFFICE
CERTIFICATE OF CORRECTION

| | |
|---|---|
| PATENT NO. | : 7,266,073 B2 |
| APPLICATION NO. | : 10/839119 |
| DATED | : September 4, 2007 |
| INVENTOR(S) | : Kenzo Ishibashi et al. |

Page 1 of 1

It is certified that error appears in the above-identified patent and that said Letters Patent is hereby corrected as shown below:

Title Page, Item (57), line 1, "which comprising" should read -- including --.

Column 29, line 45, "sampling/holing" should read -- sampling/holding --.

Signed and Sealed this

Twenty-fifth Day of December, 2007

JON W. DUDAS
*Director of the United States Patent and Trademark Office*